(12) United States Patent
Jaeger

(10) Patent No.: US 7,240,284 B2
(45) Date of Patent: Jul. 3, 2007

(54) METHOD FOR FORMATTING TEXT BY HAND DRAWN INPUTS

(76) Inventor: Denny Jaeger, 6120 Valley View Rd., Oakland, CA (US) 94611

( * ) Notice: Subject to any disclaimer, the term of this patent is extended or adjusted under 35 U.S.C. 154(b) by 381 days.

(21) Appl. No.: 10/672,112

(22) Filed: Sep. 26, 2003

(65) Prior Publication Data

US 2004/0060000 A1 Mar. 25, 2004

Related U.S. Application Data

(63) Continuation-in-part of application No. 10/635,704, filed on Aug. 5, 2003, which is a continuation-in-part of application No. 10/054,277, filed on Jan. 24, 2002, now abandoned, which is a continuation of application No. 09/880,397, filed on Jun. 12, 2001, now Pat. No. 6,863,145, which is a continuation-in-part of application No. 09/785,049, filed on Feb. 15, 2001.

(51) Int. Cl.
*G06F 15/00* (2006.01)
(52) U.S. Cl. ............... 715/517; 715/530; 715/521; 715/527; 715/529
(58) Field of Classification Search ............. 715/517, 715/530, 521, 527, 529
See application file for complete search history.

(56) References Cited

U.S. PATENT DOCUMENTS

| | | | | |
|---|---|---|---|---|
| 5,850,211 A | * | 12/1998 | Tognazzini | 345/158 |
| 5,881,169 A | * | 3/1999 | Henry, Jr. | 382/187 |
| 6,029,172 A | * | 2/2000 | Jorna et al. | 707/102 |
| 6,046,740 A | * | 4/2000 | LaRoche et al. | 715/764 |
| 6,499,043 B1 | * | 12/2002 | Forcier | 715/541 |
| 6,768,928 B1 | * | 7/2004 | Nagasawa et al. | 700/98 |
| 6,834,388 B1 | * | 12/2004 | Elsbree | 719/316 |

\* cited by examiner

*Primary Examiner*—Stephen Hong
*Assistant Examiner*—Kristina Honeycutt
(74) *Attorney, Agent, or Firm*—Harris Zimmerman

(57) ABSTRACT

A method for text editing includes drawing a staircase object which is recognized by the software and replaced by a machine rendered staircase object. The user places alphanumeric characters adjacent to each step of the staircase object, the font, case, style, color and punctuation indicating the format of the heading of each step. An arrow is drawn from the staircase object to a text object to apply the heading formats. A graphic object such as a bullet may be assigned to any staircase heading and thereafter appear whenever the heading is evoked.

8 Claims, 18 Drawing Sheets

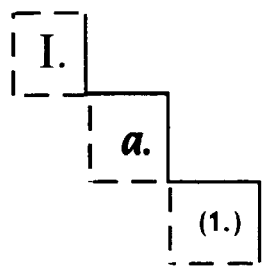

> [X] The essential aspect of sample text is that it uses the maximum number of words to convey the minimum content or meaning.
>     A. This enables the illustration of various functions without the difficulty of confusion with descriptive text.
>         1. Sample text may run on for many, many lines without actually stating any fact or relating anything of substance, but that is the nature of sample text.
> A. The lack of any intellectual content also minimizes the distraction of the reader from the point being made by the presence or format of the text, or any transaction involving text, whether as single words, lines, paragraphs, or text objects composed of any of these groupings.

> [X] The essential aspect of sample text is that it uses the maximum number of words to convey the minimum content or meaning.
>     A. This enables the illustration of various functions without the difficulty of confusion with descriptive text.
>         1. Sample text may run on for many, many lines without actually stating any fact or relating anything of substance, but that is the nature of sample text.
>     B. The lack of any intellectual content also minimizes the distraction of the reader from the point being made by the presence or format of the text, or any transaction involving text, whether as single words, lines, paragraphs, or text objects composed of any of these groupings.

FIG. 8B

METHOD FOR FORMATTING TEXT BY HAND DRAWN INPUTS

CROSS-REFERENCE TO RELATED APPLICATIONS

This application is a continuation-in-part of U.S. patent application Ser. No. 10/635,704, filed Aug. 5, 2003, which is a continuation-in-part of application Ser. No. 10/054,277, filed Jan. 24, 2002, now abandoned which is a continuation of U.S. patent application Ser. No. 09/880,397, filed Jun. 12, 2001, now U.S. Pat. No. 6,863,145 which is a continuation-in-part of U.S. patent application Ser. No. 09/785,049, filed Feb. 15, 2001, for which priority is claimed. The entireties of the prior applications are incorporated herein by reference.

FEDERALLY SPONSORED RESEARCH

Not applicable.

SEQUENCE LISTING, ETC ON CD

Not applicable.

BACKGROUND OF THE INVENTION

1. Field of the Invention

The present invention relates to methods and devices for editing text displayed on a screen and, more particularly, to methods for editing text displayed on a screen.

2. Description of Related Art

The copending patent applications captioned above describe a graphical user interface for a machine having a screen display. A significant feature of the interface is that it provides the means for hand drawn entry of on-screen objects which may be associated with functions, files, connections, and other objects or actions accessible by the system to carry out the user's desired purpose, whatever it may be. A salient aspect of this interface is the ability to carry out commands and actions corresponding to the hand drawn inputs as they are applied to any on-screen object, including (but not limited to) text presented as text files, ASCII files, word processing files and their equivalent in standard word processing applications.

The hand draw approach utilizes hand drawn objects and various user-definable connects between those objects and various contexts of those objects (among other characteristics) to implement and control text editing functions. Furthermore, these hand drawing techniques increase the speed and familiarity and flexibility of a wide range of typical text editing processes, by replacing them with non-menu driven operations. Also, many of these prior art text editing operations can be utilized only according to set orders or set procedures. These orders and procedures, in many cases, can be eliminated by the present invention, which can be used to edit either typed text, hand printed or written text or voice recognition text or the equivalent of these.

Editing Voice Recognized Text: Using current technology, a computer user may employ a microphone connected to the input of a computer, to simply speak words intended to become text (dictate letters, documents, etc.). Improved voice recognition software and increased processing power have made this technology more commonplace today. As the text is spoken, it is processed by the software in the computer and presented (shown) on a computer screen as familiar text—in whatever font is the default for such a system. Generally, the software provides specific, limited techniques for entering punctuation in the spoken text. However, the most intuitive way to speak text is not to speak the punctuation, the paragraph start and stops and the indents, etc. Such text housekeeping "speak" is not easy and tends to interrupt the train of thought of the speaker. What is preferable is the ability to simply speak naturally (as if talking on the telephone) and then edit the text later.

Regarding editing after voice recognition input of text, it is well known that voice recognition software inevitably misunderstands some words, phrases, and sentence structures. Although it is possible to direct the software to these errors and enter corrections by further voice inputs, this is a laborious task that slows the overall text input process and greatly impedes widespread acceptance of voice recognition software. Many voice recognition software users (and many non-users of computers) cannot operate a typewriter keyboard effectively, either because of disabilities or lack of manual keyboard skills. Clearly there is a need in the prior art for effective text editing that, like voice recognition inputs, does not rely on an alphanumeric keyboard and mouse, as do common word processing applications.

The hand drawing approach to text editing is such a system. It provides an arrangement to very quickly and intuitively edit text that may (after initially speaking or otherwise entering the text) be stored into a computer as one or more large paragraphs, i.e., many pages long. Hand draw editing enables users of spoken text to edit this text into a finished document very easily. This same technique can also be used for text typed on an alphanumeric keyboard, which may be many pages long and may need reordering, cutting and pasting, formatting, and/or other types of correction.

Editing Typed Text: Currently, if one engages the heading software for some of the word processing applications, the software enters an "A", for example, as the heading for a paragraph. When the user hits the return or enter key to drop the cursor down to a new paragraph, the software automatically enters a new heading letter. However, if one desires to type a second paragraph under the "A" heading, and hits the return key to start the second paragraph, the software automatically places the next outline heading "B". It is then necessary to delete this heading, move the tabs on a ruler to adjust the new text to line up under the existing "A" heading and type the second paragraph. Placing headings selectively in text should be more flexible and accommodating to the user's needs for multiple paragraphs under a single heading. Also, current systems of outlining are rigid, not permitting users to define outline possibilities that do not exist in a program or that may not be considered logical types of outlines. Users should be able to create their own outline structures in any manner of their choosing, not according to set protocols or procedures. Finally, the use of color and font types, styles and sizes are generally limited and at best difficult to use. This should be much simpler to do and lend itself more easily to user customization.

Hand printed or script recognition of text: The invention has the same benefit when applied to text resulting from handwriting recognition software as from voice recognition and the typing of text.

BRIEF SUMMARY OF THE INVENTION

The present invention generally comprises a system for editing text in a computer or word processor using hand drawn inputs. This invention is directed toward text formatting tasks such as outline and heading formats, setting margins, and establishing tab settings.

Note: The text that can be edited with the present invention can be text that is recalled into the software of this invention from existing programs, e.g., word processors, graphics programs that support text, and other types of programs that utilize text. The other type of text that can be edited by the present invention involves text that is created entirely by the software of this invention. Regarding this text, a definition is required for what is termed herein a "text object."

A text object is created by the placement of a text cursor either in primary Blackspace (anywhere on the monitor—what is presently call their desktop) and in VDACC Blackspace (anywhere within the perimeter of a VDACC—Virtual Design and Control Canvas—see copending application titled. "AAAA".) The placement of a text cursor in either primary Blackspace or VDACC Blackspace and the subsequent typing of text creates a text object. When another text cursor is placed, where the placement of such text cursor is sufficiently distanced from the existing text of an existing text object, and then text is typed, this new typing of text creates a separate text object. A default distance exists for the placement of a text cursor away from text in an existing text object, which creates a new text object. This distance may be as small as a few pixels. So placing a text cursor beyond this distance from an existing text object followed by the typing of new text will create a new text object. If the text cursor is placed in an existing text object, or within the default distance from an existing text object, the cursor will edit, add, or delete text from the existing text object, rather than forming a new text object.

NOTE: Text objects can be typed or printed or verbally placed in two environments: (1) in Primary Blackspace, and (2) in one or more VDACCs. The use of the invention may slightly change depending upon which environment one or more text objects are existing in.

In one aspect, the invention introduces the use of a staircase object for establishing a heading/outline format for text. The user draws a staircase object comprising either a continuous line or multiple lines in a stair configuration that automatically "agglomerate" to each other based upon various recognition means as disclosed in U.S. patent application Ser. No. 09/785,049, filed Feb. 15, 2001. The staircase object must have at least one horizontal and vertical segment in alternating order to define a stepped, descending (or ascending) figure. Shape recognition software recognizes the object and indicates a successful recognition by, e.g., replacing it with a machine rendered staircase object having a similar size and configuration as the drawn object and located in the same position onscreen, or highlighting the hand drawn staircase, or the like. The user then places alphanumeric characters adjacent to each step to exemplify the heading/outline format that will be applied to a text object. The placement of these characters can be by any means available to a user, e.g., typing on a keyboard, hand printing or script recognition, voice recognition and the like. The headings may be uppercase or lowercase letters, numbers, Roman numerals, or any combination of these characters, including parentheses and punctuation marks. These heading can also include objects, like circles or ellipses or squares. These headings can be any size or style and they do not have to match the font, style or size of the text to which they are added to become headings. The heading characters become bound (agglomerated) to the staircase object.

An arrow is then drawn to a text object (either completed, undergoing editing, or being created) to apply the heading format of the staircase object to the text. Furthermore, the heading style that is set up by a staircase object may be applied to more than one text object and, indeed, the staircase object may be saved and recalled to be applied to any text object in the future. As an alternative method for applying the heading style of a staircase object, the staircase object may be clicked and dragged to overlay at least partially the text object to which it will be applied.

The width of the steps of the staircase object can determine the leftward indentation of each heading with respect to the other headings, and the height of the riser of each step can determine the vertical spacing of the heading sections. Alternatively, the leftward indentation and the vertical spacing can be according to a default setting, where the size of the stair object's individual stair steps will not determine these factors. In either case, these parameters may be adjusted by the user clicking and dragging on the staircase segments and moving them up or down or right or left.

A heading indentation is created by typing (or otherwise entering) a heading character followed by the <Enter> key or a period at the beginning of a text line. Other types of actions could be easily substituted for the action of typing a period or hitting an <Enter> key. For instance, a spoken word could be used or typing a dash or an underscore, forward slash, backward slash, brackets, etc. Additionally, some headings can automatically invoke recognition, like "( )" or "[ ]" or "{ }", etc. When these characters are typed they may require no period and no Enter key or equivalent, they would just be recognized.

Note that the user types a character in the style of the heading (for example, uppercase letter, or numeric character), and the software recognizes this context (heading character typed at the beginning of a text line) and responds by, (1) changing the heading into the color, font, style and size of the heading agglomerated to a staircase object, and (2) indenting the line to the extent determined by the staircase dimensions or by a default setting in the software. The color, font, style and size of each heading category can all be different. Each heading character typed adjacent to each stair step represents a category of headings, e.g, a capital "A" represents all capital letters, a "1" represents all numbers of this type, etc.

It is significant that the user may enter any heading character in a text input and the software will automatically change it to the correct serial count for that specific text input. For instance, a user could repeatedly and successively type "1." at the beginning of a line that the user want to use as the start of a numerically headed paragraph. Recognizing this context, the software will automatically change the successive "1"s to the next consecutive number, e.g., 2, 3, 4, etc. Thus the user need not keep track of the correct heading count (alphabetic or numeric); the software will do this automatically. Note that typing a heading character that was placed in a stair object, e.g., an uppercase character or a number within the body of the text, will not cause a heading to be created. This is due to the fact that the context (typing a heading within the text body) is not appropriate for a heading, and the software will not create a heading in that circumstance.

Herein the term "Not appropriate" is simply defined as a heading that was not entered on any stair of a stair object. Users simply enter, by typing or drawing, or speaking the types of headings that they wish to have recognized when they type headings at the front of any new paragraph or at the beginning of a new sentence in a body of text. The software of this invention looks only for the heading categories that match the types of headings that are entered on a stair object that is in turn applied to a body of text.

Each new heading that is created by the software can be a separate text object. If this is the case, each heading as a separate text object may be moved, copied, changed, etc. in the same manner that any object may be treated. The editing of a heading text object may be accomplished by right clicking on the heading and selecting "Edit Text" or its equivalent in the Info Canvas for that heading.

Margins may be formatted in a text object by first drawing a vertical arrow pointing downwardly to the top of the text object. The software responds to this action and context (the context being an arrow drawn vertically downwardly to the top of a text object) so that, on the upclick after drawing the arrow, a horizontal margin line will appear (in a color that may be selected by the user) at the top of the text object, spanning the text object. Another way of getting a margin line and margin arrows visible above a text object in a VDACC is to right click on the VDACC and select "Show text margin arrows" or its equivalent. Then a margin line and a left and right margin arrow will automatically appear at the top of the VDACC which contains the text a user wishes to edit. Back to the first method, where you draw a vertical arrow to create a margin line, at the point of the software recognizing this arrow both a margin line and a left and right margin arrow can be automatically created or a margin line and just the arrow that was draw becomes a margin arrow and a second margin arrow may be set by duplicating and dragging the margin arrow to a desired spacing from the first arrow, or by drawing the second arrow downwardly to the margin line and dragging it to a desired position along the margin line. The margin arrow and margin line are bound (agglomerated), and the margin arrows cannot be moved vertically after they are created although they can be slid from side to side horizontally along the margin line. The user may select any portion of the text in a text object, or select all of the text in a text object, or select text that is comprised of multiple text objects and then click and drag either margin arrow to change the margins of the selected text. Moving the margin arrows changes the margins for selected text. If a group of lines of text or sentences is selected, and differing margin settings have been previously applied to some of these lines or sentences, the margin arrows will move to indicate the margin settings of the top line of text of the selected group. When the user sets right and left margin arrows and then types in text under the margin line, each new horizontal line of text will be governed by these margin settings. Thus the text margins will be uniform, unless and until the user changes the position of one or both of the margin arrows. When either of the arrows is moved, all of the text typed under that arrow will be reset accordingly.

Tab stops may be added to the margin line by typing or writing one or more "T" characters and dragging them to the desired tab position(s) on the margin line.

Alternately, when a margin line and margin arrow or arrows are created by the software, one tab "T" can be created with them, where the "T" sits at a default distance from the left margin. This "T" may be clicked on and moved or clicked on and held for a default length of time, e.g., one second, and it is duplicated and can therefore be slid to another position along the margin line. Margin arrow settings may be copied from one piece of selected text or group of selected text objects and applied to another one or more pieces of text. This is accomplished by selecting a margin arrow or arrows (just the left margin arrow, just the right margin arrow or both the right and the left margins arrows) and copying their settings. The selection of these margin arrows can be done by various methods.

One method is to right click on the left margin or right margin arrow only and in the Info Canvas for either arrow, select "Copy" or "Duplicate" or some equivalent entry. Using this method to select both the right and left margin arrows simultaneously could be done by right clicking on the margin line (not either margin arrow) and in the Info Canvas for the margin line select "Copy" or "Duplicate" or some equivalent entry.

Another method is to use the lasso function and lasso either the left margin arrow or the right margin arrow or both arrows or intersects the margin line itself. Lassoing just the left margin arrow or right margin would select one or the other. Lassoing both of them or lassoing the margin line itself, would select both margin arrows. Then right click on whatever has been selected and in the Info Canvas that appears select "Copy", "Duplicate", etc.

Still another method is to draw an ellipse such that it either intersects or mainly encircles either the left margin arrow, the right margin arrow or both or intersects the margin line itself. Drawing an ellipse to encircle or intersect just the left margin arrow or right margin would select one or the other. Drawing an ellipse to encircle or intersect both margin arrows or intersecting just the margin line itself, would select both margin arrows.

Any of the methods above for copying the margin line and arrows of a text object may also at the same time copy all of the tab settings that pertain to the copied margin line.

Further Definitions:

Primary Blackspace: This is the area of one's desktop. Blackspace is not necessarily Black. Blackspace also refers to a general method of inputting to a computer, working on the computer, and outputting from the computer as provided by the software as described in the pending applications captioned above.

VDACC Blackspace: This is anywhere within the outer perimeter of a VDACC. See co-pending application entitled: "VDACCs and Info Canvases . . . ". Note: Text Objects can be typed in two environments: (a) in Primary Blackspace, and (b) in a VDACC.

Duplicate: In this software system, the GUI technique for duplicating an onscreen object (including a text object, graphic/picture, active button, file, and the like) includes the steps of placing the cursor (or the tip of a pen on a touch screen) on the onscreen object, holding at that position for a preset minimum time (i.e., one second (adjustable by the user)), and dragging a duplicate of the object away from the object location to another onscreen location.

Text Object: a group of one or more alphanumeric characters that are grouped or associated in accordance with software rules; for example, if the characters are entered at the same text cursor placement; imported or recalled from the same source and pasted into Blackspace or a VDACC to form a new text object or pasted into another existing text object to be added to the existing text object, or two or more text objects that are joined, e.g., by lassoing and gluing together, to form a single text object.

Text Mode: a mode in which any change or action applied to any part of a text object is applied to the entire text object. Examples includes changing font, font size, font color, font style. Left clicking on a text object in text mode and thereafter dragging causes the entire text object to be moved with the dragging cursor, whereas left clicking and dragging in text edit mode causes text to be highlighted.

Arrow Logic: arrow logics are described in copending U.S. patent application Ser. No. 09/880,397, filed Jun. 12, 2001. Briefly, in this technique a line or arrow is drawn that has a transaction conveyed to it, one possible transaction being generally defined as "take the items(s) at the tail of the arrow or line and assign them to the object at the head of the arrow or line." This arrow or line is extended from one onscreen item to another to create a transaction between the two objects that is defined either specifically by the user or by the context of the arrow placement or by a default setting.

BRIEF DESCRIPTION OF THE DRAWING

FIG. 7 is a graphic depiction of a staircase object having mixed character styles and colors, and depicts the area under a stair object stair that accepts heading style category inputs.

FIG. 8A depicts a text object in which an out-of-sequence heading character is typed into the text object.

FIG. 8B depicts the text object of FIG. 8A, indicating the software correction of the out-of-sequence character and the resulting heading indentation.

DETAILED DESCRIPTION OF THE INVENTION

The present invention generally comprises a system for editing text in a computer or word processor using hand drawn inputs. The invention is based on the use of hand drawn onscreen objects, and the use of arrow logics, as described in U.S. patent application Ser. No. 09/880,397, filed Jun. 12, 2001, and U.S. patent application Ser. No. 09/785,049, filed Feb. 15, 2001, referenced above and incorporated herein by reference. The text to be edited may be acquired by voice recognition software input, OCR input, keyboard entry, use of previously entered text stored on hard drive, floppy drive, CDR, CDRW, CD-ROM, DVD, or any other computer media. Likewise, the text may be acquired by transmission via email, email attachment, FTP link, network, server, or the like.

In the description below, the term "arrow" can also indicate a line that is programmable to convey a transaction. The transaction can be an action, a function, a link, a cause and effect, an association, etc., between two or more objects.

This invention is directed toward text formatting tasks such as outline and heading formats, setting margins, and establishing tab settings. With regard to FIG. 1A, the invention introduces the use of a staircase object for establishing an outline/heading format. To apply an outline/heading format, the user first draws (by mouse, touchscreen, or the like) a staircase object 21 which is a multi-segment line (either continuous line or multiple strokes) having at least one vertical and one horizontal segment formed in alternating order to define a stepped figure. The shape recognition software analyzes and identifies the staircase object 21, and replaces it with a machine drawn staircase object 22. The object 22 is located in the same position and orientation as the hand drawn object 21, and may have the same size and configuration (number of steps, height of steps, width of steps, etc.) as the hand drawn object 21. Alternatively, the final size of the stair object may be preset and regardless of the size of the hand drawn stair object, the recognized stair object has its dimensions controlled by a preset size. However, the number of stairs and whether the first stair starts with a vertical or horizontal line would directly determine the shape of the final recognized stair object.

Figure 1A:
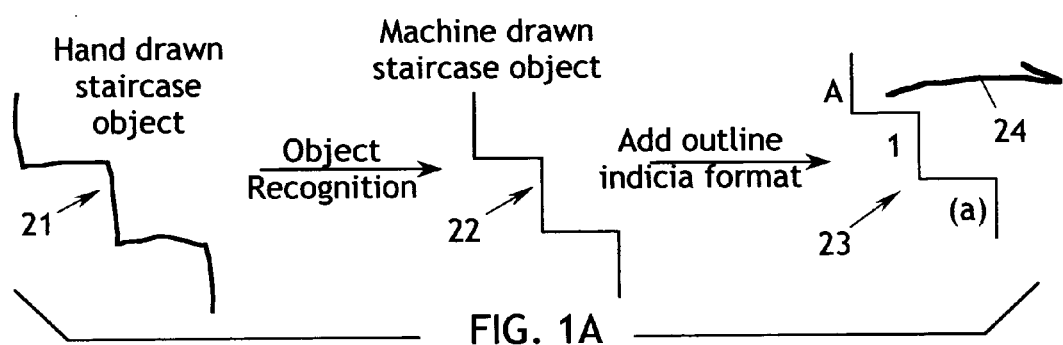
FIGS. 1A and 1B are graphic depictions of drawn steps to create a staircase object for setting outline/heading styles and spacings.
Figure 1B:
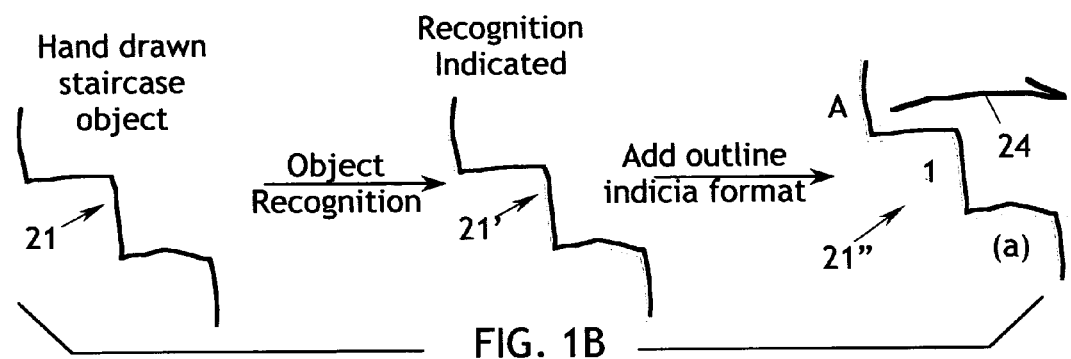

As an alternative to the process depicted in FIG. 1A, the hand drawn staircase object 21 may be recognized, and the indication of recognition may be highlighting the hand drawn object, as shown by reference numeral 21', or a change in color of the object 21, or some other graphic, audible, or visible indication that does not involve replacing the hand drawn object. The process then proceeds as described below, and the examples of FIGS. 1A and 1B are considered equivalent.

Figure 6A:
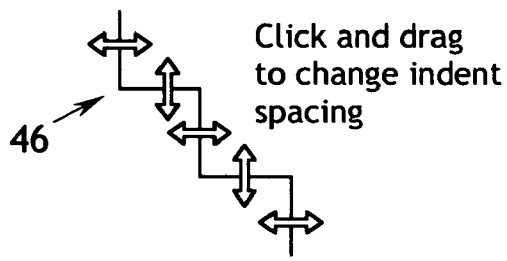
FIG. 6A is a graphic depiction of the resizing feature of the staircase object of the invention.
Figure 6B:
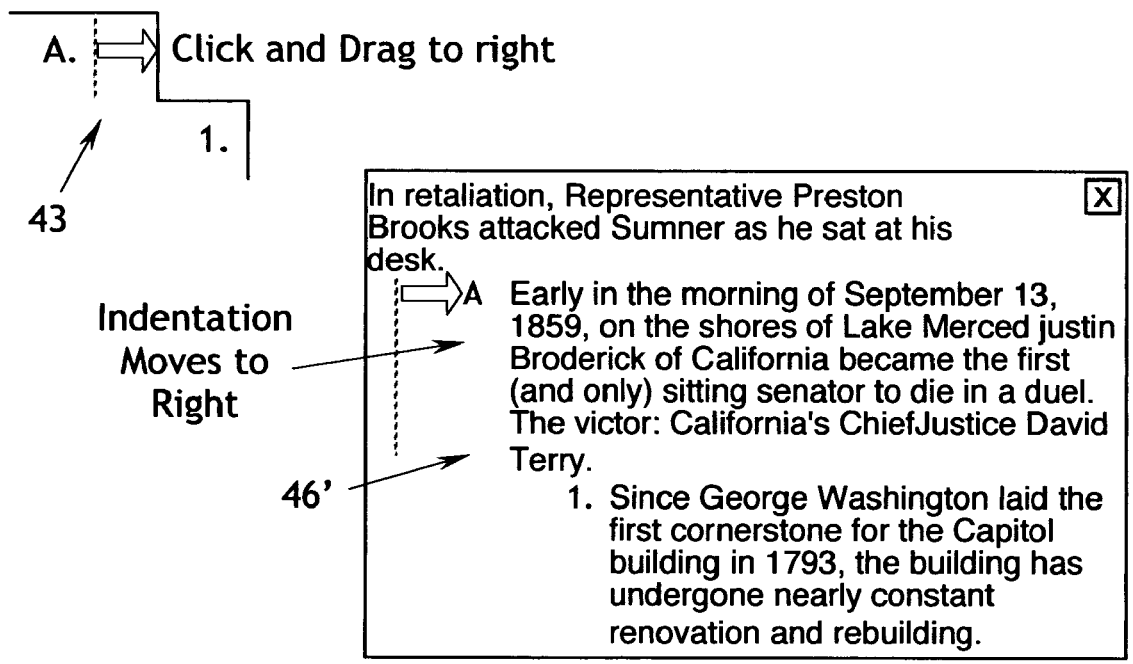
FIG. 6B depicts the text example of FIG. 5B being modified by resizing the staircase formatting object.

The methodology for recognizing the hand drawn staircase object is based on the techniques for recognizing a hand drawn rectangle, as described in U. S. patent application Ser. No. 09/785,049, referenced above and, in particular. FIGS. 6A–6C of that patent application. Briefly summarized, hand drawn inputs are analyzed as slices to define and analyze strokes. The length of each segment is calculated, as well as the end-to-end angle, the start angle, finish angle, the trend of the segment, and the straightness (sustained curvature). These values are used to detect characteristics that are determinants of object shape.

When the routine reaches the end of the stroke, it goes to an Analyze Stroke routine. This routine calculates a minimum size bounding rectangle for a stroke, and also calculates factors such as stroke length, the end-to-end angle, the start angle, finish angle, and stroke trend. It also calculates the mean of the segment trends of the stroke, the straightness, and the mean of the segment straightness of the stroke. These values are also used to detect characteristics that are determinants of object shape. The process described above may be reiterated until the entire hand drawn sequence of points (hand drawn entry) is analyzed, all vertices are recognized, and the calculated parameters are stored. The number of vertices detected is a significant factor in determining the type of geometric shape that has been drawn, or intended to be drawn.

Figure 1C:
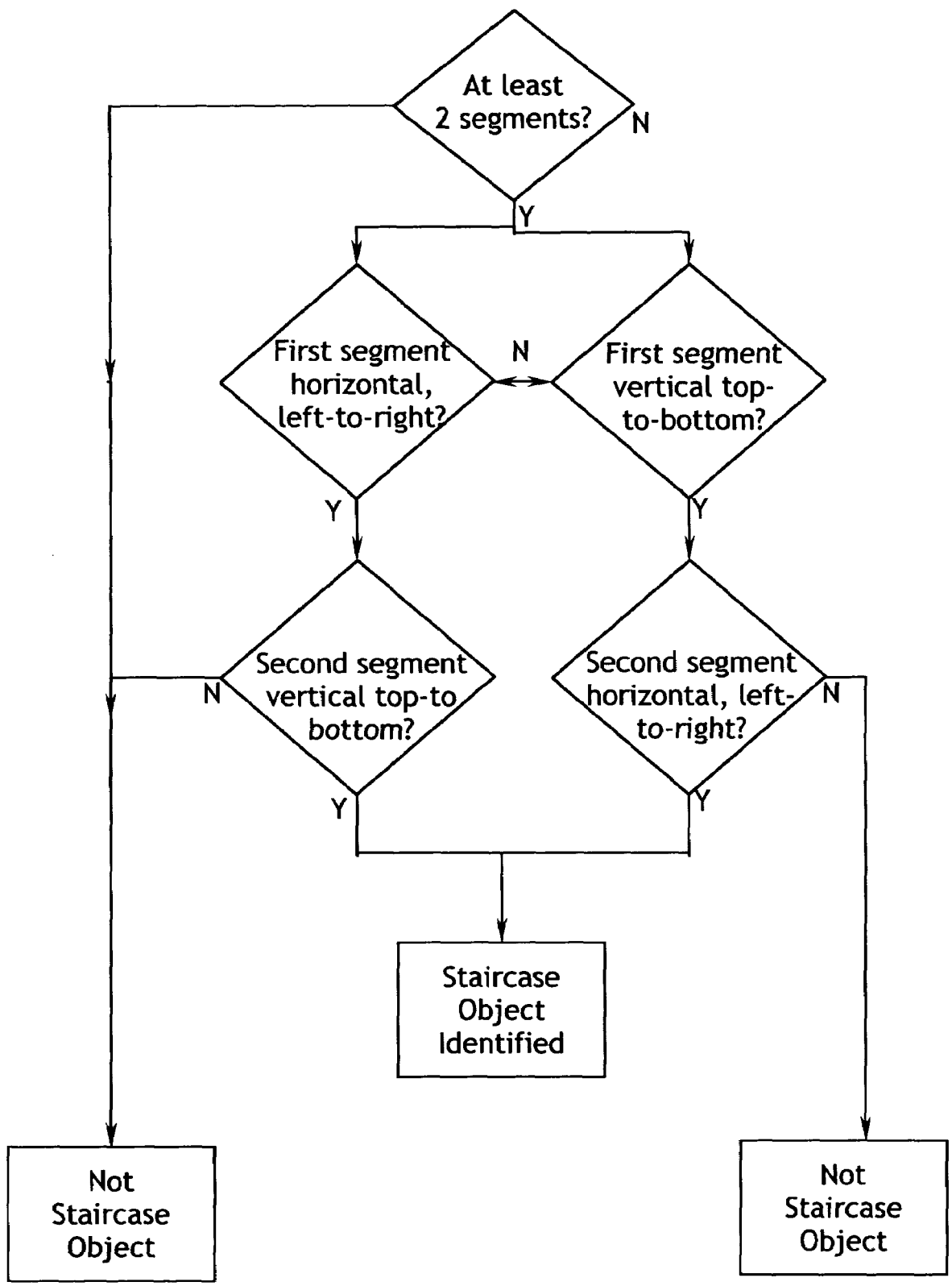
FIG. 1C is a flow chart depicting the steps for identifying a hand drawn staircase object input.

To distinguish a staircase object from any other hand drawn input, the software carries out the steps detailed in FIG. 1C. First, it determines if there are at least two segments to the hand drawn input; if not, the input is not a staircase object. The decision tree then determines if the first line segment is horizontal and drawn from left-to-right, or vertical and drawn from top-to-bottom. In the next step, the routine determines if the second line segment is, respectively, vertical and drawn from top-to-bottom, or horizontal and drawn from left-to-right. Thus the second segment must be generally vertical if the first segment was horizontal, or generally horizontal if the first segment was found to be vertical. If either of the decision paths is positive, a staircase object is identified and recognized onscreen.

The user then places an alphanumeric indicator adjacent to the riser of each step in the staircase object 21" or 22. As shown in FIG. 1A or 1B, the user types or writes (as in FIG. 4) the indicia category that will comprise the format of the headings of the text. In the example of FIG. 1, "A" is placed adjacent to the topmost riser, "1" is placed adjacent to the second riser, and "(a)" is placed adjacent to the third (bottommost) riser. The user may choose any style of alphabetic or numeric characters, including parentheses and punctuation marks, which then exemplifies and becomes the heading format category. The alphanumeric indicia are automatically agglomerated to the staircase object 22, forming in combination therewith the staircase formatting object 23. An arrow 24 is then drawn to a text object (either completed, undergoing editing, or being created) to apply the heading format of the object 23 to the text, as described below.

As an alternative to the use of an arrow to apply the heading format of a staircase object, the system may be set to recognize the user gesture of clicking and dragging the staircase object until the staircase object overlaps at least a portion of the text object. Likewise, another technique that may be used is to click or tap on the staircase object, thereafter click or tap (within a settable time limit) on the text object to which the staircase object is to be applied to carry out the transaction.

It is significant to note that the width of the steps of the staircase object may be used to determine the leftward indentation of each heading with respect to the other headings, and the height of the riser of each step may be used to determine the vertical spacing of the heading sections, or preset values may be used for these parameters. The user can determine which is the case by making a selection in the Info Canvas for the Staircase Object. If it is determined that the size of the stair steps determines the indentation and vertical spacing of the text, then the step widths and riser heights may be made selectively equal or unequal to create any desired heading indentation and vertical spacing. An advantage of the ability to change the, stair object itself to alter either the horizontal or vertical spacing of any given outline heading placed adjacent to a stair step riser is that this permits the spacing for all headings of a certain category (i.e., all capital letter headings) to have their horizontal indenting or vertical spacing altered at one time. Thus this becomes a very fast method for adjusting such indenting and spacing for an entire document.

Figure 2:
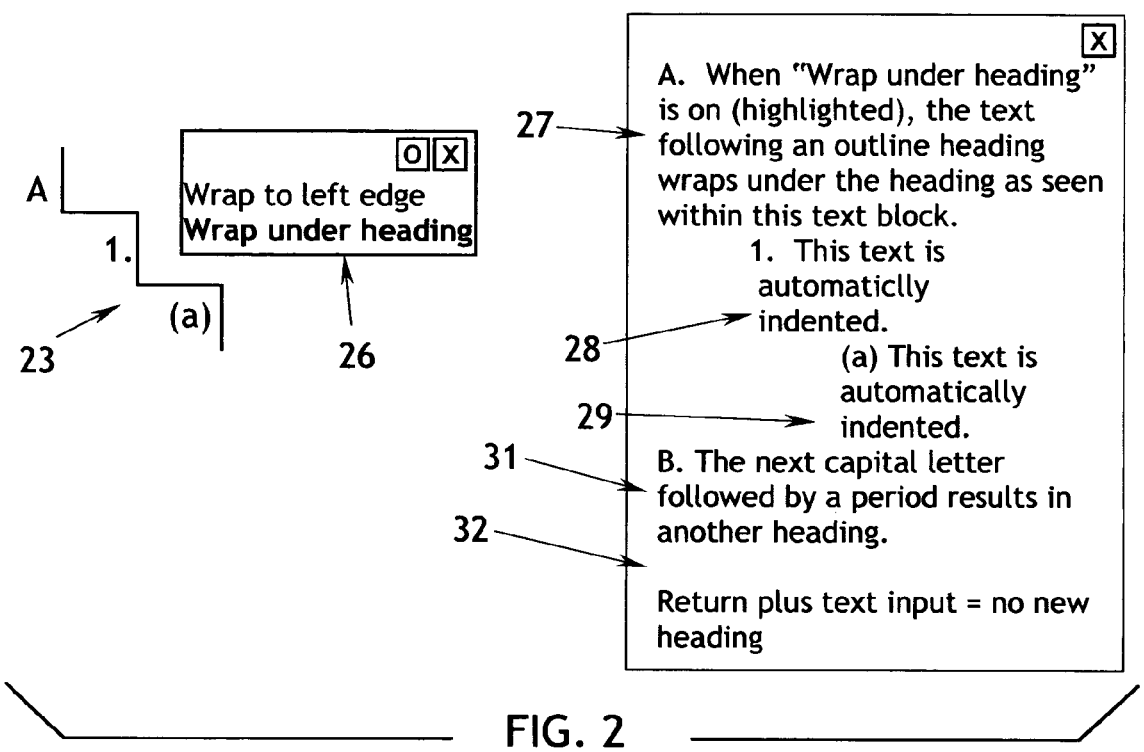
FIG. 2 is a graphic depiction of the heading indentations created by a staircase object when the text is not wrapped to the left edge.

The heading format created by the object 21" or 23 determines that whenever the user types (or otherwise enters) an uppercase letter followed by a period at the beginning of a line of text, the following text will be wrapped at its left edge to a predetermined line referenced to the uppercase letter. Note: a period is not the only punctuation that can be used to create a heading by enabling the software to recognize a typed heading at the beginning of a sentence. For instance, a dash could be used or an underscore or an asterisk or the hitting of the <Enter> key or a vocal command. As shown in FIG. 2, the user may right click (or the equivalent) on the object 23 to call forth a display of an Info Canvas 26 that pertains to the object 23. (In the predecessor applications referenced above, the term "Info Window" was used for the object 26, and the two terms are considered to be equivalent.) The Info Canvas 26 presents, inter alia, a selection "Wrap to left edge" and "Wrap under heading." When this latter selection is on (highlighted), the text following an outline heading wraps under the left edge of the heading indicia, as shown in FIG. 2. Thus text block 27 is left aligned to the letter "A", text block 28 is left aligned and indented under the number "1", and text block 29 is left aligned and indented under the left edge of the parenthesis of "(a)". Note that the leftward indentation of each text block 28 and 29 generally conforms to the width of the corresponding step of the staircase object 23.

Figure 3:
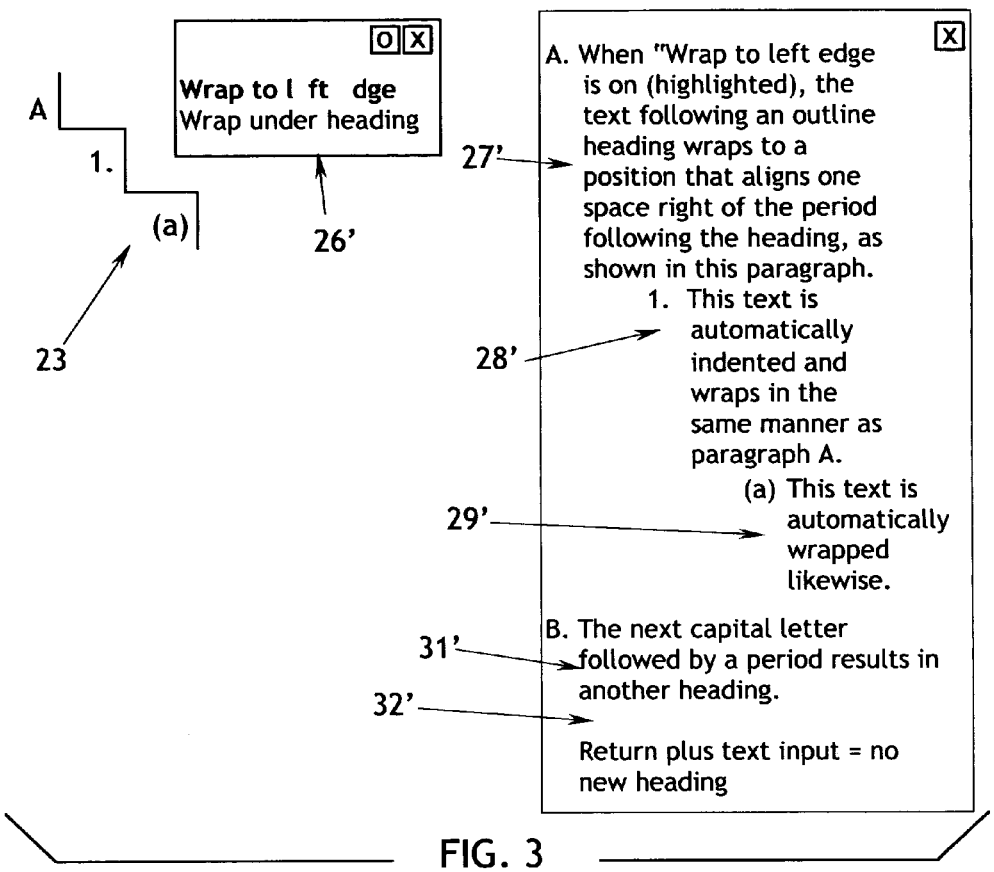
FIG. 3 is a graphic depiction of the heading indentations created by a staircase object when the text is wrapped to the left edge.

With regard to FIG. 3, the user may instead select and activate the "Wrap to left edge" entry in the Info Canvas 26'. This selection causes the text following an outline heading to wrap to a position aligned two spaces to the right of the period following the respective heading, as indicated by text blocks 27', 28', 29', and 31'. Note that the leftward indentation of each heading conforms to the width of the corresponding step of the staircase object 23, but the text blocks are indented rightward an additional four spaces from the right of the period following each heading.

It is significant to note that the user may start a new paragraph under any heading by hitting the Enter key or Return Key followed by further text input to create further paragraphs or line spacing under an existing heading, as shown by reference numeral 32 in FIGS. 2 and 3. This action does not cause the software to create a new heading letter or number. The software creates a new heading only when a letter or number (which is part of a category entered under a stair in the staircase formatting object applied to the text being typed) followed by a period or other acceptable character, e.g., a "( )" or "[ ]", etc., is typed by the user at the beginning of a line. This feature pertains to all examples and text in this invention.

Figure 4:
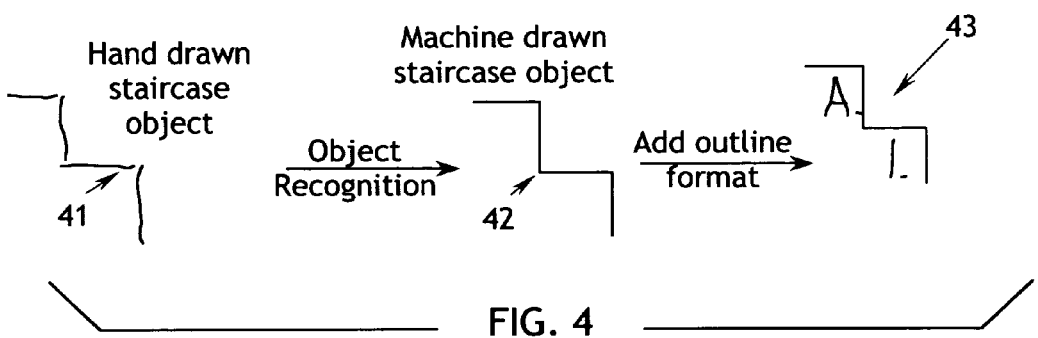
FIG. 4 is a graphic depiction of drawn steps to create a staircase object and add hand drawn heading characters.

FIG. 4 depicts an example in which a staircase object 41 is hand drawn as a plurality of discrete lines, with the uppermost portion being a horizontal step, followed by a descending riser, a second horizontal step, and another descending riser. The object 41 is recognized and replaced by a software rendered staircase object 42, which may have the same size and configuration as the hand drawn object 41, or be rendered at some default size. The user may then write, print or speak the alphanumeric character categories that comprise the format of the outline headings that will be applied to a text object. A category is defined as a group of characters that follow in logical order behind a first character entered in a staircase object. For instance, typing an "A" under a staircase step would establish a category of capital letters. So, letters which would automatically follow in this category would be B., C., D., etc. In FIG. 4, the user prints "A." and "1." adjacent to the two stair risers. The printed indicia are recognized and replaced by the software with their machine-rendered counterparts to form a staircase formatting object 43. The alphanumeric characters are agglomerated to the staircase. This agglomeration process can be caused by multiple actions, i.e., hitting the Enter key or its equivalent after typing one or more alphanumeric character adjacent to stair risers, or having a gap default (a predetermined distance) which automatically causes agglomeration, or a vocal command or its equivalent.

Figure 5A:
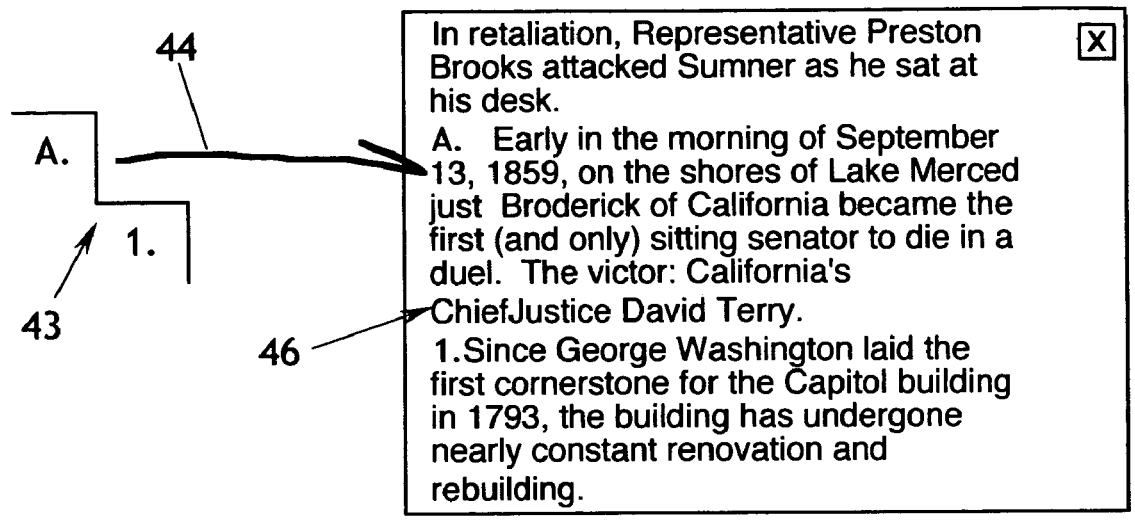
FIG. 5A is a graphic depiction of a staircase object being applied to a text object by an arrow logic transaction.
Figure 5B:
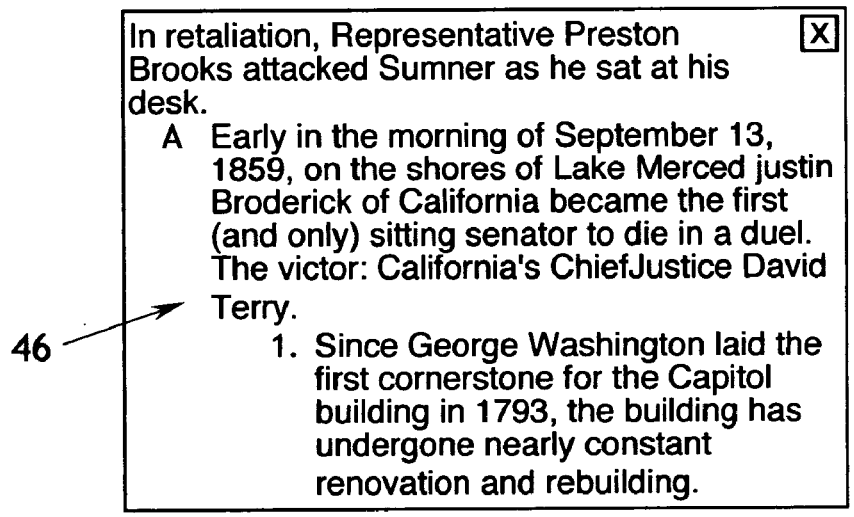
FIG. 5B is a graphic depiction of the headings caused by the staircase object in the text object of FIG. 5A.

With regard to FIG. 5A, an arrow 44 may be drawn from the staircase formatting object 43 to an existing text portion 46. Note that the text portion 46 has already been provided with some outline headings. As shown in FIG. 5B, the formatting of object 43 is applied to text 46, causing the text following the "A." to be indented and the text following the "1." to be further indented. The amount of indentation may be set to be in accordance with the width and height of each step of object 43, if the user has chosen this option in the Info Canvas for the stair object applied to the typed text. If not, the indentation of text will be according to a default setting. The same is true for the vertical spacing above each heading. For the purposes of FIGS. 5A and 5B it is assumed that the user has selected a default setting for the indentation or vertical spacing above each heading. Note that the first heading "A." is indented from the text above it, corresponding to the fact that the initial top portion of the object 43 is a horizontal step portion. Thus text may be typed or otherwise input and thereafter formatted using a staircase object.

Furthermore, the staircase object 43 may be saved and recalled to apply its formatting to other text portions or text objects. This is an important point. A single drawn and recognized staircase object can be used over and over again on multiple text objects and multiple VDACCs containing text. One important application of this is that each placement of a text cursor (outside of an existing text object) and the subsequent typing of text, creates a single text object. The staircase object, when an arrow is drawn from it to a text object, generally controls only that text object (unless multiple text objects are linked together, which could be accomplished by gluing them or grouping them so they function as a single object). However, in the absence of such a grouping, drawing an arrow from a staircase object to control a text object, will in fact control only that text object. So in this manner, a user can apply a staircase outline to only part of their typed text, namely one text object among many comprising a single document.

With regard to FIG. 6A, any staircase object 46 may be resized as desired. The user may click on any portion of the object 46 (horizontal step or vertical riser) and drag to move the selected portion and change the configuration. The corresponding changes in the width or height of any stair step in a staircase object are applied to change the corresponding text category heading indentation and vertical spacing of any text portion to which the staircase object has been assigned, or to which it may be assigned in the future. For instance, as shown in FIG. 6B, when the riser portion of the step under which the "A." is entered is dragged to the right, the indentation of the text following this heading will increase the indentation to the right. Likewise, moving the riser to the left will decrease the indentation of this text. It should be noted that the indentation of all headings of this category will be changed, thus this provides a very fast way to adjust the horizontal indentation or vertical spacing of every heading of a certain category in a text object. In this example it is all capital letter outline headings.

It is significant to note that the user may apply any style or font to the alphanumeric characters placed in a staircase object and that these styles, fonts, and sizes don't have to match the styles, font and size of the text to which these headings are being applied. As shown in FIG. 7, the first heading is a Roman numeral in Times font, 18 pt in red, the second heading is a lowercase "a" in a stylized Textile font, 12 pt. in blue, and the third heading is a sans serif font, 10 pt in black. Note that the user may type any Roman numeral followed by a period or an <Enter> key, and the heading will be rendered in Times 18 pt red. In addition, with regard to FIG. 7, the character(s) entered in the style chosen by the user may be recognized as heading characters (agglomerated to the staircase object) if they are typed within the rectangular boundaries established by the dotted line continuations of the staircase object. So, as an example only, a user can place a text cursor anywhere under the stair step as long as it is within the dotted boundaries shown in FIG. 7 and the character will program the staircase object—be agglomerated to it and become a valid heading category for that staircase object. As an alternative to placing text categories directly under each stair step according to rectangular boundaries, the software may establish a maximum distance from the staircase object for characters to be recognized as heading categories for that step.

Also, it is significant that the user may enter any heading character in a text input typed at the beginning of a line in the body of typed text and the software can automatically change it to the correct serial count for that text input. This feature can be turned on or off in the Info Canvas of the staircase object. Referring to FIG. 8A, a user may type "A." (or "A <Enter>") at the beginning of a sentence (reference numeral 47), and the software will replace it automatically with "B." to indicate the correct (second) paragraph count, and indent the paragraph in alignment with the previous corresponding heading section, as shown at reference numeral 48. Thus the user need not keep track of the correct heading count (alphabetic or numeric); the software will do this automatically. Likewise, the user may type "1." at the beginning of any line (sentence), and the software will call forth a numeric heading in the proper numerical order and indent the subsequent paragraph. Note that typing an uppercase character or a number within the body of the text will not cause a heading to be created, due to the fact that the context (appearing within the text body) is not appropriate for a heading, and the software will not create a heading in that circumstance. Also note that typing any heading, either upper case or lower case characters, at the beginning of a sentence (line) that is not provided for as a category entered under one of the stair steps for a staircase object, will not cause a heading to be created. This is because the software looks for only those headings that fall within the heading categories entered under the steps for a staircase object that has been applied to the body of text (text object) being typed.

Each new heading that is created by the software generally belongs to the same text object. Thus a single arrow drawn from a staircase object to a text object will control that entire text object according to the headings that are entered into that staircase object, whether or not the text object is 50 pages long or one paragraph. Each separate text object may be moved, copied, changed, etc. in the same manner that any object may be treated. This has the following advantages:

1) All headings along with the text object they are applied to may be easily repositioned up/down, left/right by clicking and dragging anywhere within a VDACC.

2) By using the Text mode for the software, each text object can be changed, as a whole, in color, text style, font, or size without disturbing any of the other text objects and without having to select all of the text in the text object.

3) Each text object and its headings can be assigned to a recognizable object or assigned to a switch or the like, without affecting the remainder of the text (the other text objects) in a document. This has the added benefit of providing a very fast and easy way to make copies of text objects with their headings for later use, or permitting modifications to be made to an entire text object by drawing an arrow from a change in a font, font style or size and applying it directly to the object to which the text was assigned, rather than having to assign it to the text itself. For example if a text object was assigned to a blue circle, a user could draw an assignment arrow from a new font setup in a font VDACC or its equivalent and point the arrow to the blue circle and the font changes would be automatically applied to the text object that was assigned to that blue circle.

4) Each text object can be stretched and resized larger or smaller without affecting the remainder of the text (objects) in the document.

Figure 9A:
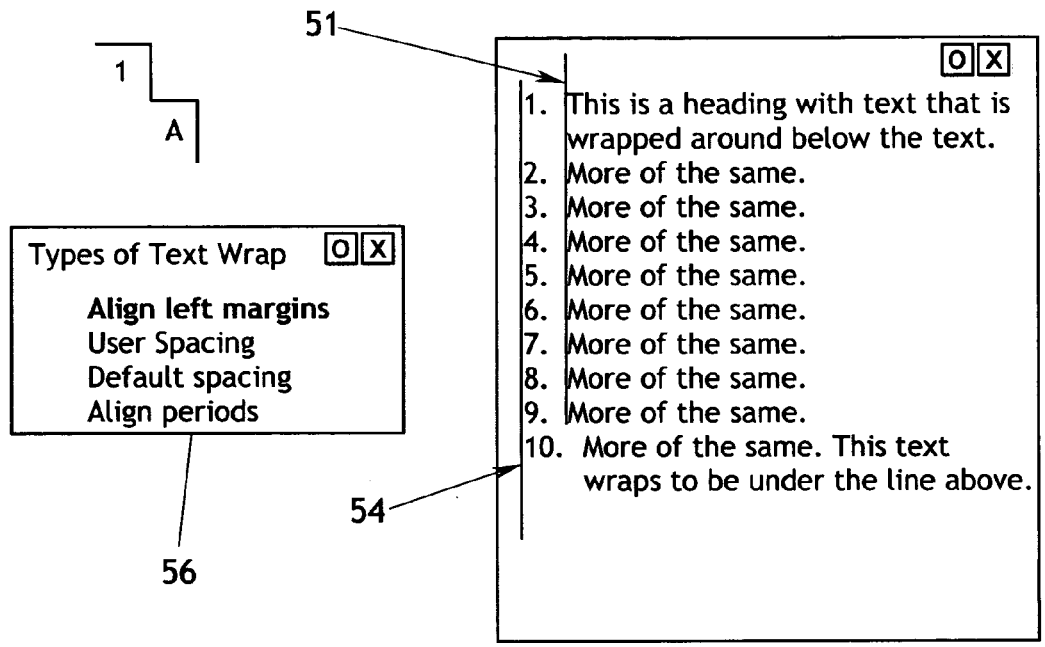
FIGS. 9A–9C are graphic depictions of one embodiment of heading alignment in which the leftmost heading characters are aligned.
Figure 9B:
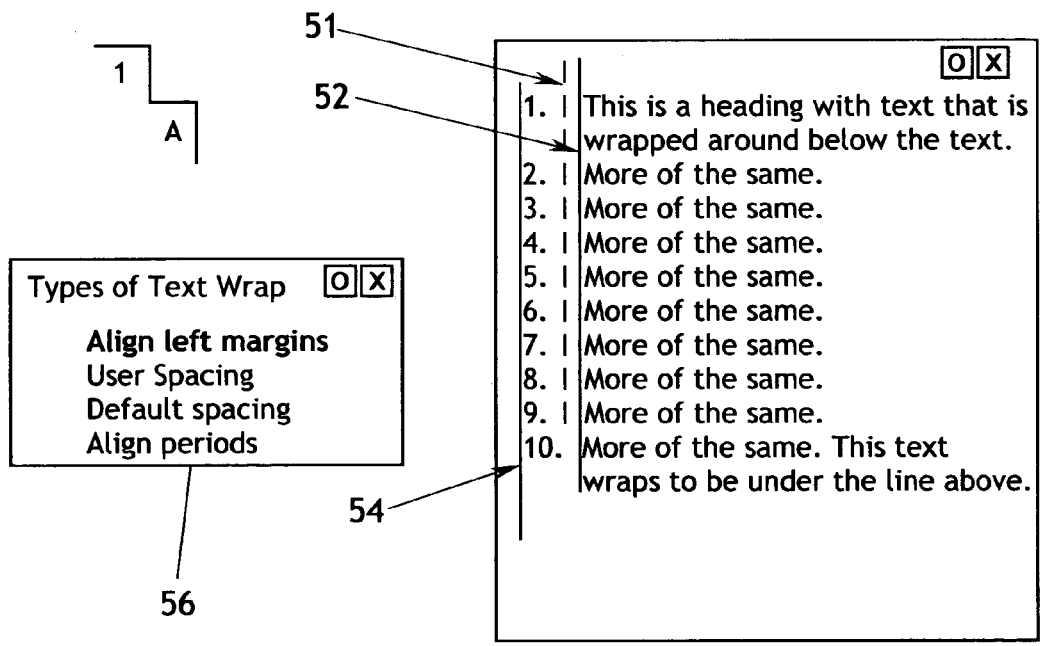
Figure 9C:
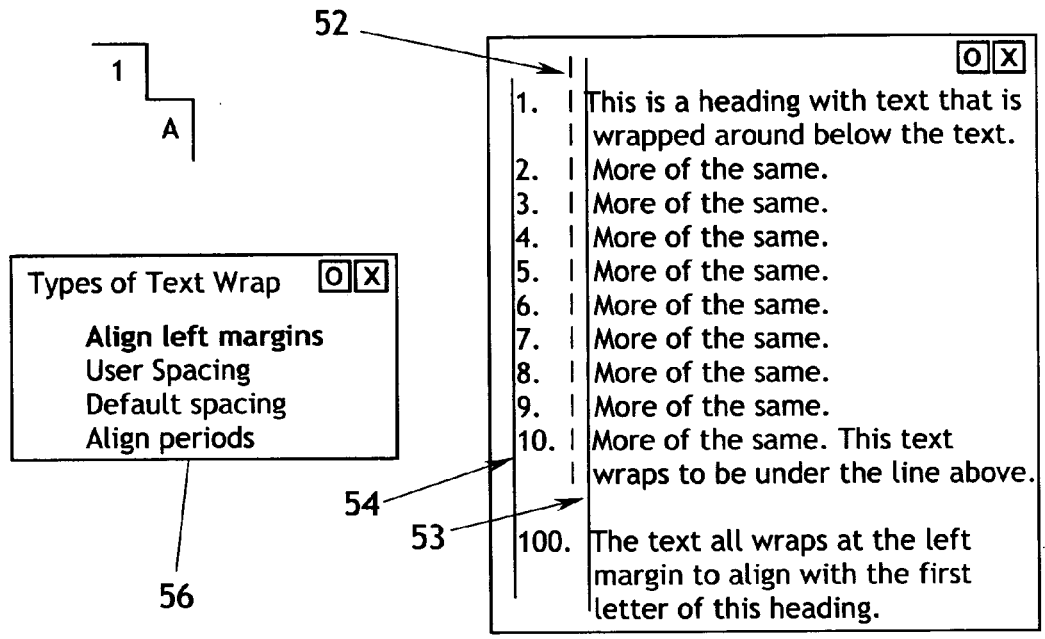

The indentations of headings based on numerical indicia may require subsequent adjustment, due to the fact that numerical headings may include double digits, (10 et seq.) triple digits (100 et seq.) and the like. This requirement may extend to Roman numerals, multiple alphabetical headings, and any other multiple character headings. The invention provides for this requirement in one approach, shown in FIGS. 9A–9C. For all single character headings (i.e., 1–9 in this example) the numbers are aligned with line 54. Two spaces are added after the period of each heading, and the text will be wrapped to a left margin that is aligned with the two-space position, as shown by reference numeral 51. If and when the number of headings extends to double digits (FIG. 9B), the text following the double digit headings is placed with a left margin that is two spaces after the period of each double digit heading, as shown by reference numeral 52. In addition, all text under previous one digit headings is reset (from its position shown by the dotted line) to align at the left with the text of the double digit heading. Thus the text following heading "9." (and all previous headings) is moved one space to the left to be left margin aligned with the text of heading "10". Likewise, if and when the number of headings increases to triple digits (FIG. 9C), the text following the triple digit headings is placed with a left margin that is two spaces after the period of each triple digit heading, as shown by reference numeral 53. In addition, all text under previous one digit and two digit headings is re-set to align at the left margin with the text of the triple digit headings. Thus the text following heading "99." (and all previous headings) is moved from the dotted line position and aligned with the text of heading "100". This approach is continued for four character heading, five character headings, etc. This approach can automatically be invoked when a user selects "Align left margins" in the Info Canvas for a staircase object that has been applied to the text that is being typed. This is accomplished by clicking on the selection "Align left margins" in the staircase object Info Canvas 56. Note that in all headings of this example, the first (leftmost) digits of the numerical headings are all aligned at a common left margin 54.

NOTE: other combinations of margin and heading configurations are possible, beyond what is described herein.

Figure 10:
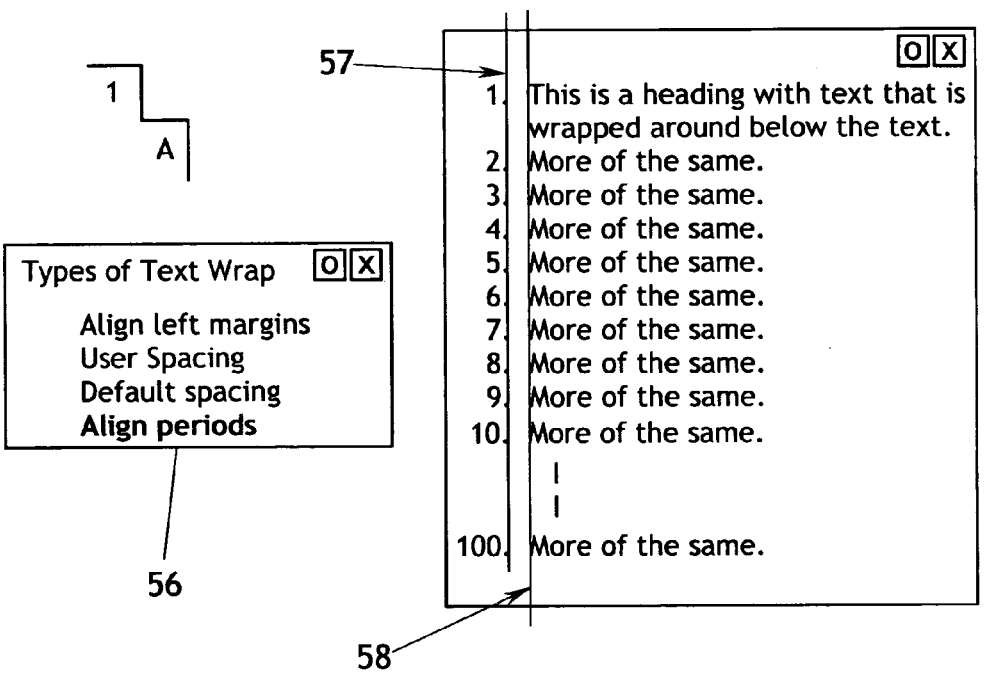
FIG. 10 is a graphic depiction of another embodiment of heading alignment in which the periods of the heading characters are aligned.

In another approach to heading alignment, shown in FIG. 10, the headings are aligned so that the periods following the headings are all aligned on a common undisplayed vertical line 57. The leftmost digits of the headings are not aligned as the headings extend to double or multiple digits. All text of all headings, whether of single or multiple digit headings, is indented two spaces (or some user-modified number) to the right of the periods, so that all text is aligned and wrapped to a vertical line 58. This approach is user-selected by clicking on the selection "Align periods" in the staircase object Info Canvas 56.

Figure 11:
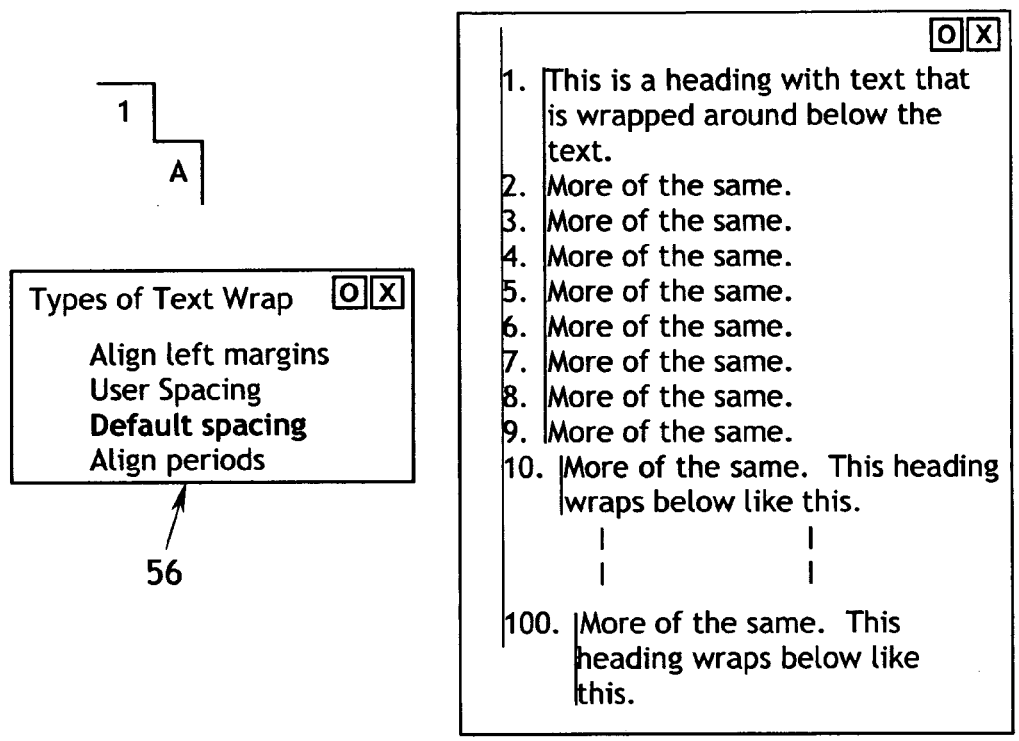
FIG. 11 is a graphic depiction of a further embodiment of heading alignment in which all heading text is aligned to be uniformly spaced to the right of the respective heading character.

A third approach to heading alignment, shown in FIG. 11, is termed "Default spacing" and is user-selected in the Info Canvas 56. In this technique, all text typed next to all headings starts two spaces to the right of the period of each heading. (This spacing can be changed by the user in the text object Info Canvas or the Stair Object Info Canvas by selecting a setting or its equivalent.) The numerical headings are left-aligned to vertical line 59, and the text of single and multiple character headings is not aligned.

Figure 12:
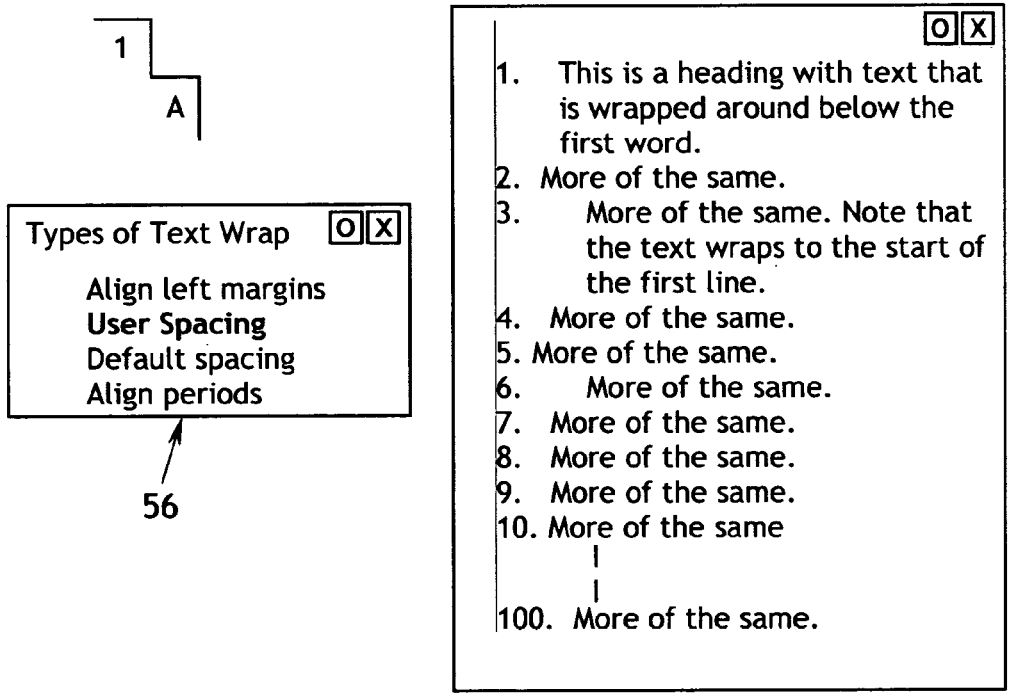
FIG. 12 is a graphic depiction of another embodiment of heading alignment in which the heading spacings are variable and individually set by the user.

A fourth approach to heading alignment, depicted in FIG. 12, enables the user to vary the heading spacing as desired on an individual heading basis. The user may select "User spacing" in the Info Canvas 56 and thereafter type as many spaces (generally using the space bar or its equivalent, e.g., a spoken command or gesture, etc.) as desired after the period of any heading. The text of that heading will wrap to the alignment of the first letter after the heading. Subsequent heading indentations can be individually determined by the number of spaces entered by the user after any subsequent heading.

Figure 13:
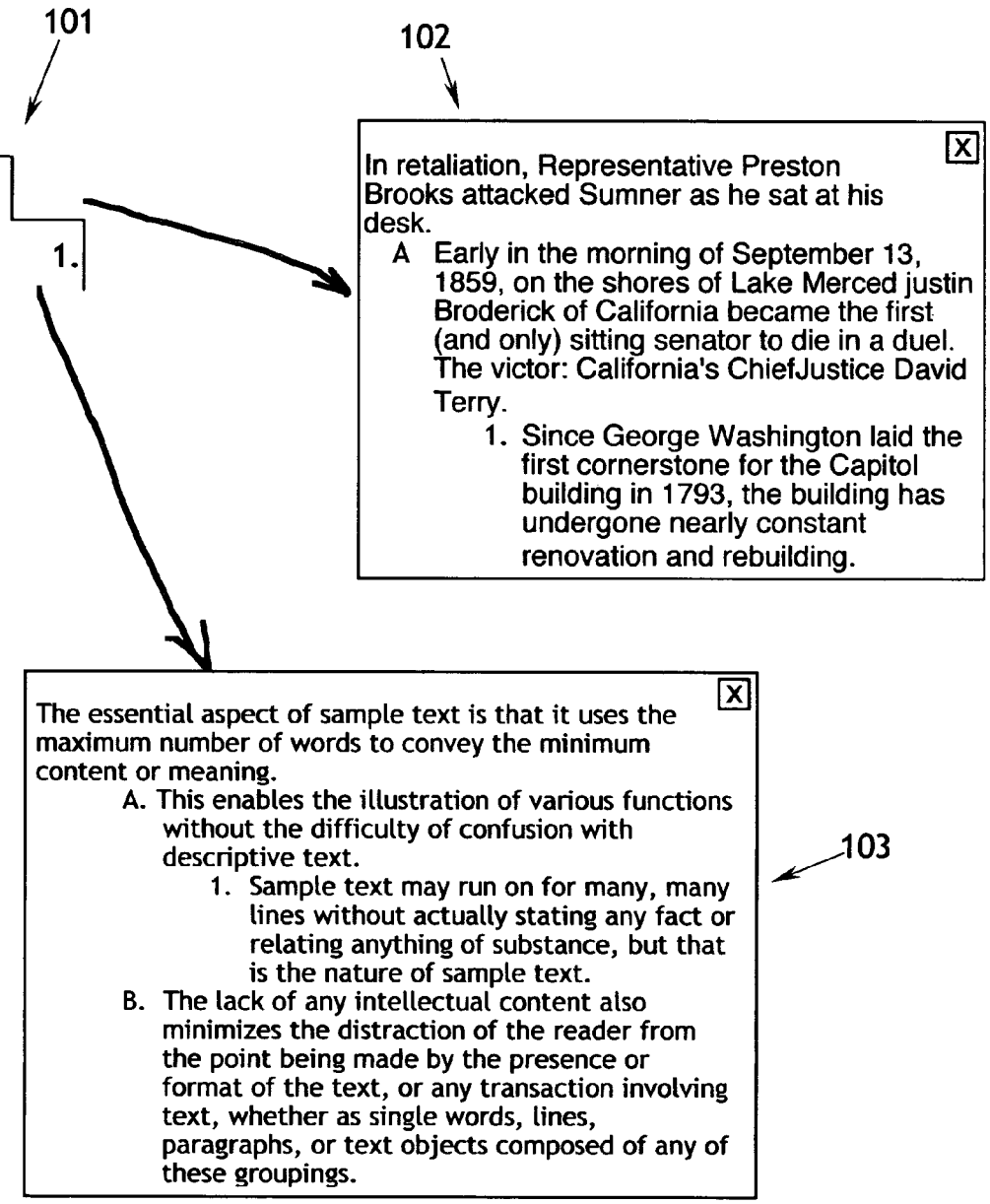
FIG. 13 is a graphic depiction of a single staircase object applied to more than one text object.

The same staircase object can be applied to control more than one text object in the same VDACC or same collection of text objects. As shown in FIG. 13, the user may draw multiple arrows from a single staircase object 101 to different text objects 102 and 103 in separate VDACCs (or in the same VDACC). The heading styles of the staircase object 101 are applied to the multiple text objects. Thus the same heading styles and appearance may be made uniform among multiple text objects.

Figure 14A:
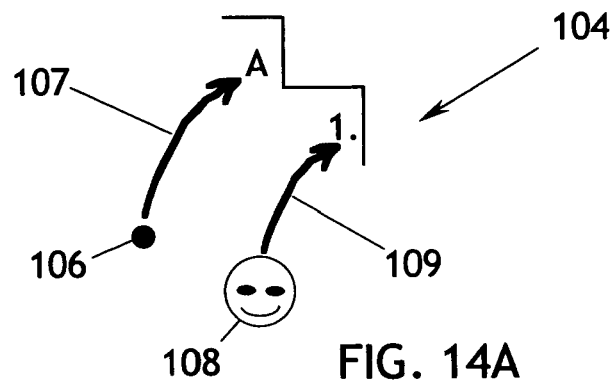
FIGS. 14A–14C depict the use of a staircase object to insert bullet headings in a text object.
Figure 14B:
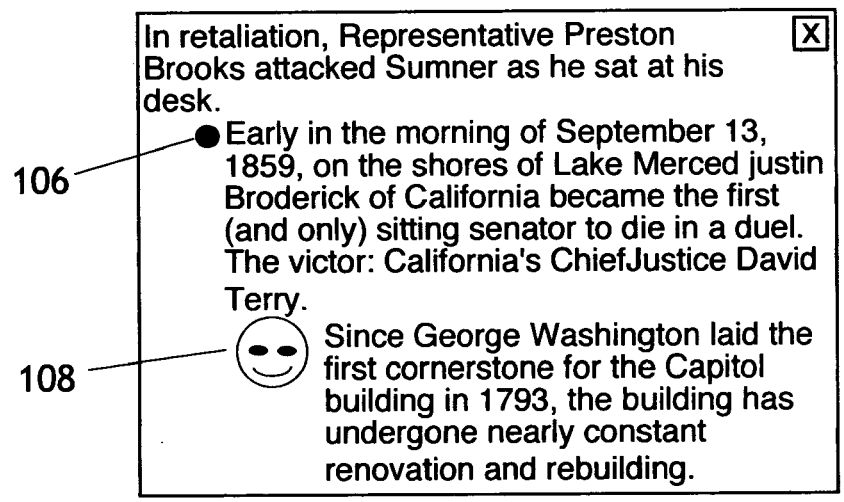

With regard to FIG. 14A, any heading character agglomerated to a staircase formatting object 104 may be changed by replacement, so that a different character, or graphic, or picture is displayed in placed of the heading alphanumeric character. For example, a bullet character 106 may be drawn or created as a text character, and a colored arrow that represents the action "replace", e.g., a blue arrow 107, is drawn from the character 106 to the "A" character that is agglomerated to the staircase formatting object 104. The transaction that is carried out by the blue arrow 107 is "replace the object at the head of the arrow with the object at the tail of the arrow." Likewise, a happy face figure 108 may be created and substituted for heading character "1." Thereafter, when the staircase object 104 is applied to a text object, such as the text object of FIG. 5B, a bullet 106 is displayed wherever an uppercase alphabet character would otherwise be displayed, and a happy face figure 108 is displayed in place of the numerical heading.

Bullets may be hand-created with 64K different colors for the perimeter line and the fill color, and they may be made any size desired. Any graphic or picture may be substituted for an alphanumeric heading category. Another technique to place a bullet or graphic/photo in a heading is to create the bullet onscreen and drag it under a stair of a staircase object to become a bullet followed by the category heading that is also under the stair; e.g., "•A" or "•1.".

Figure 14C:
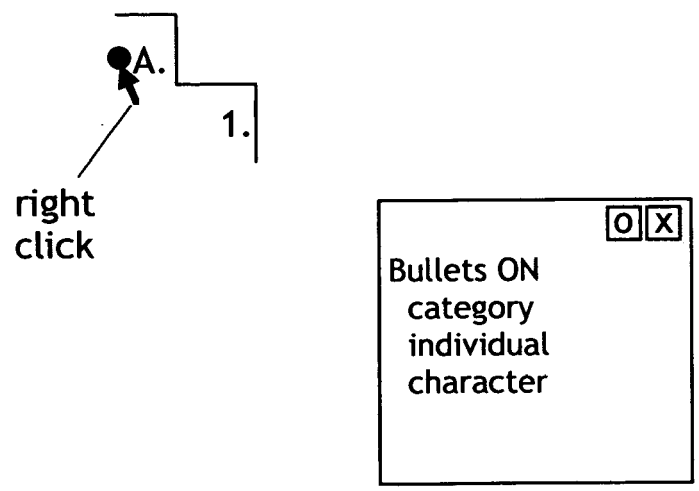

Alternatively, as shown in FIG. 14C, the user may drag the bullet under the stair next to a category heading already under the stair and then right click on the bullet to display the Info Canvas for the bullet. The user may select "Bullets ON" to turn on the bullet function described above. The Info Canvas includes two other entries. If "category" is selected, then the character accompanying the bullet under a stair represents a category of characters; e.g., "A" represents all uppercase letters, and "1" represents all numbers, and the like. If the entry "individual character" is selected, then only the character that accompanies the bullet will elicit a bullet when it is typed. As described above, like all other outline headings under stair steps, to activate a bullet in a document the user must type the character representing the bullet at the beginning of a line of text, with the character followed by a period.

Another way to type bullets at the beginning of sentences in a text object is to assign the stair object's character (a bullet in this case) to a key on an alphanumeric keyboard. For instance, a top stair containing one type of bullet could be assigned to the F1 key and a second stair containing another type of bullet (for example, a smaller bullet or a different color bullet) could be assigned to the F2 key, etc. One preferred technique is for the user to press the Enter or Return keys to wrap to a new line of text and then press the Function key to which the bullet function has been assigned.

At any time the user may change a heading category of a staircase object, or substitute one object for a heading character(s). If the modified staircase object is currently applied to a text object, all headings will be modified accordingly and immediately. If the modified staircase object is later applied to a text object, all the headings will be modified accordingly at the time the staircase object is applied to the text object.

Figure 15A:
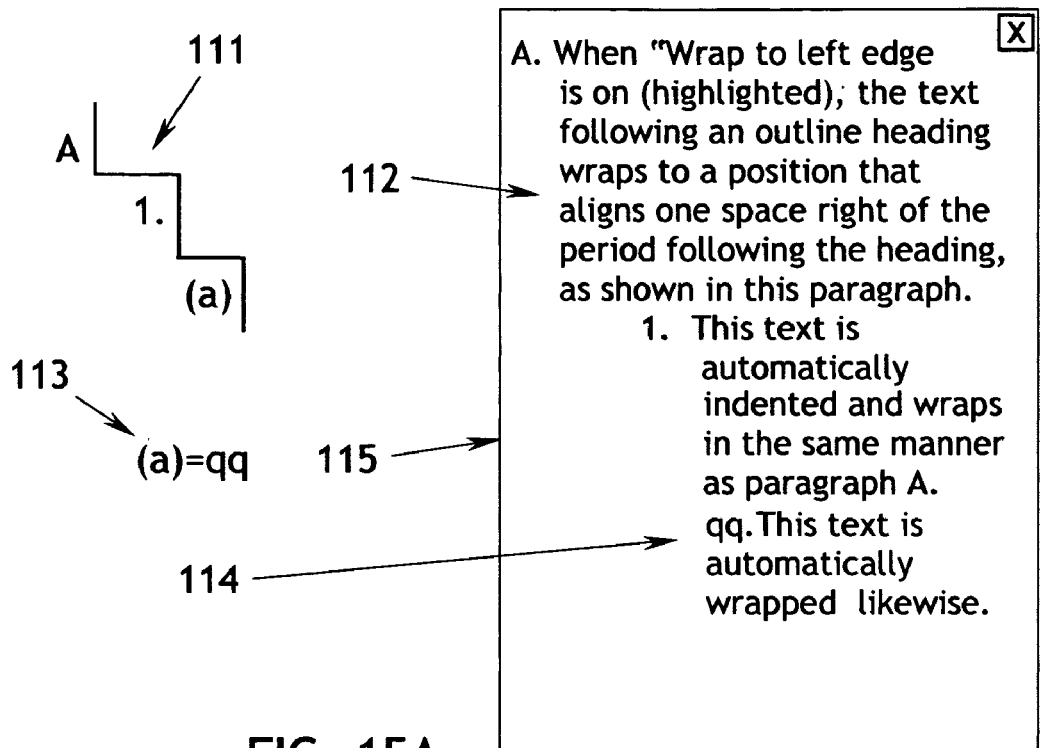
FIGS. 15A and 15B depict the use of a staircase object and heading style input substitution.
Figure 15B:
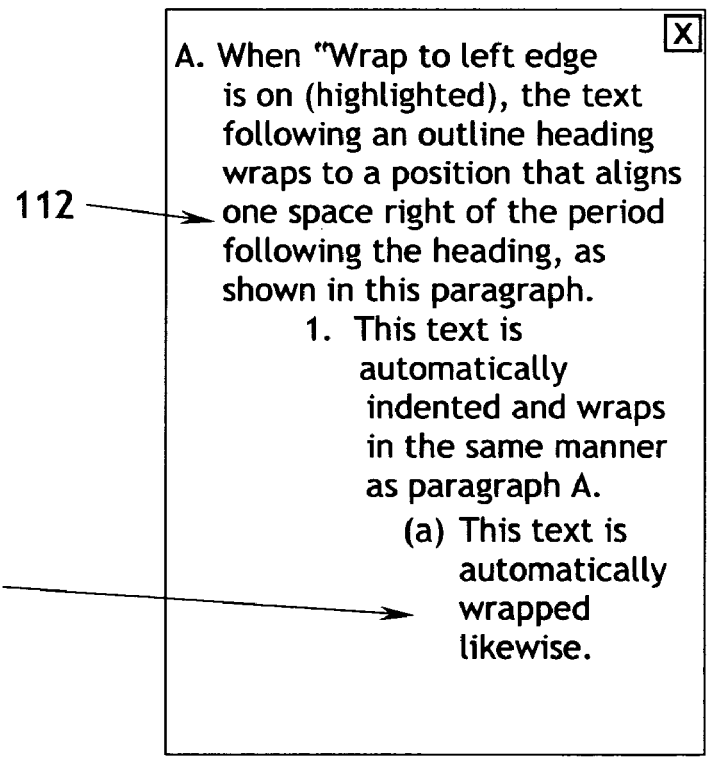

For headings that require multiple character inputs to invoke, such as "(a)", the invention provides a simple, more convenient technique for invoking a heading. With regard to FIG. 15A, a staircase formatting object 111 is applied to a text object 112 in a VDACC 115. The user applies the equation "(a)=xx" where xx represents any two alphabetic characters. In this example the user enters the equation 113: "(a)=qq". Thereafter, the user may enter the letters "qq." as indicated by reference numeral 114 at the beginning of a text line to invoke the third order heading style ((a), (b), (c), ... ), as shown at reference numeral 116 in FIG. 15B.

The invention also provides for setting margins and tabs for text. With regard to FIG. 16, the margin for any text object 61 may be set by first drawing a vertical arrow 62 pointing downwardly to the top of the text object. (The drawn object 62 may equivalently be any designated line or shape, such as a check mark, a vertical line of a designated color, or the like.) The software recognizes the hand drawing of this arrow and upon recognition, it responds to this action and context (arrow drawn vertically downward pointing to the top of a text object) so that, on the mouse or pen upclick after drawing arrow 62, a horizontal line 63 will appear (in a color that may be selected by the user) at the top of the text object 61, spanning the width of the text object (if it has been typed in Primary Blackspace) or spanning the width of the VDACC (if the text object has been typed in a VDACC). Note: this text object would most likely be typed into a VDACC to take advantage of the auto text wrapping feature of the VDACC, but it could be typed directly in Primary Blackspace. When text is typed into a VDACC, the text automatically wraps when it hits the right edge of the VDACC. (Refer to FIGS. 20 and 21 for more description of this.) When the user clicks and holds on the arrow 62, a dashed line 66 is displayed to demarcate the margin that is set by the arrow 62. Note: another method to enable seeing vertical dashed lines under each margin arrow is to right click on any margin arrow and in the Info Canvas for that arrow select the entry entitled: "Show Margin Line". The user may draw a second arrow 64 directed downwardly to the margin line 63 to demarcate the margin at the opposite side of the text object 61. Either arrow 62 or 63 may be drawn first to demarcate left or right margins. The second arrow may be copied from the first by clicking on the first drawn arrow, holding for some period of time, e.g., one second, and then dragging a copy to the desire position along the margin head line 63. Note that the arrows 62 and 63 may be clicked on and dragged horizontally to change the margin settings and cause selected text in object 61 to rearrange their right and/or left margins. The arrows 62 and 63 are agglomerated to the line 63 and cannot be dragged vertically.

Figure 16:
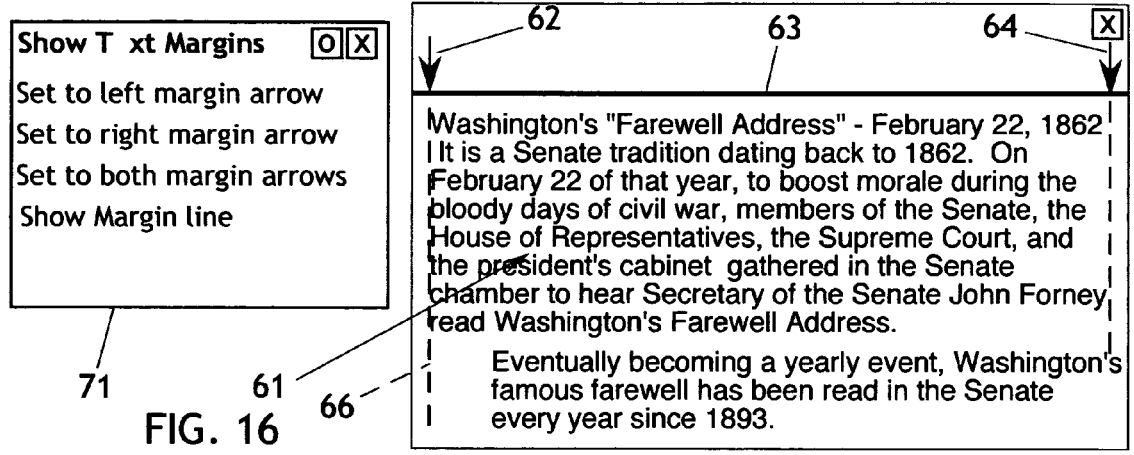
FIG. 16 is a graphic depiction of a margin line and margin arrows applied to a text object.

As shown in FIG. 16, the VDACC has an Info Canvas 71 that may be displayed by right-clicking (or the equivalent) on any blank area of the VDACC—anyplace where there is no text object, graphic object, picture, etc. One selection in the Info Canvas 71 is "Show margin line" which may be selected to hide/show the margin line and the margin arrows.

Figure 24:
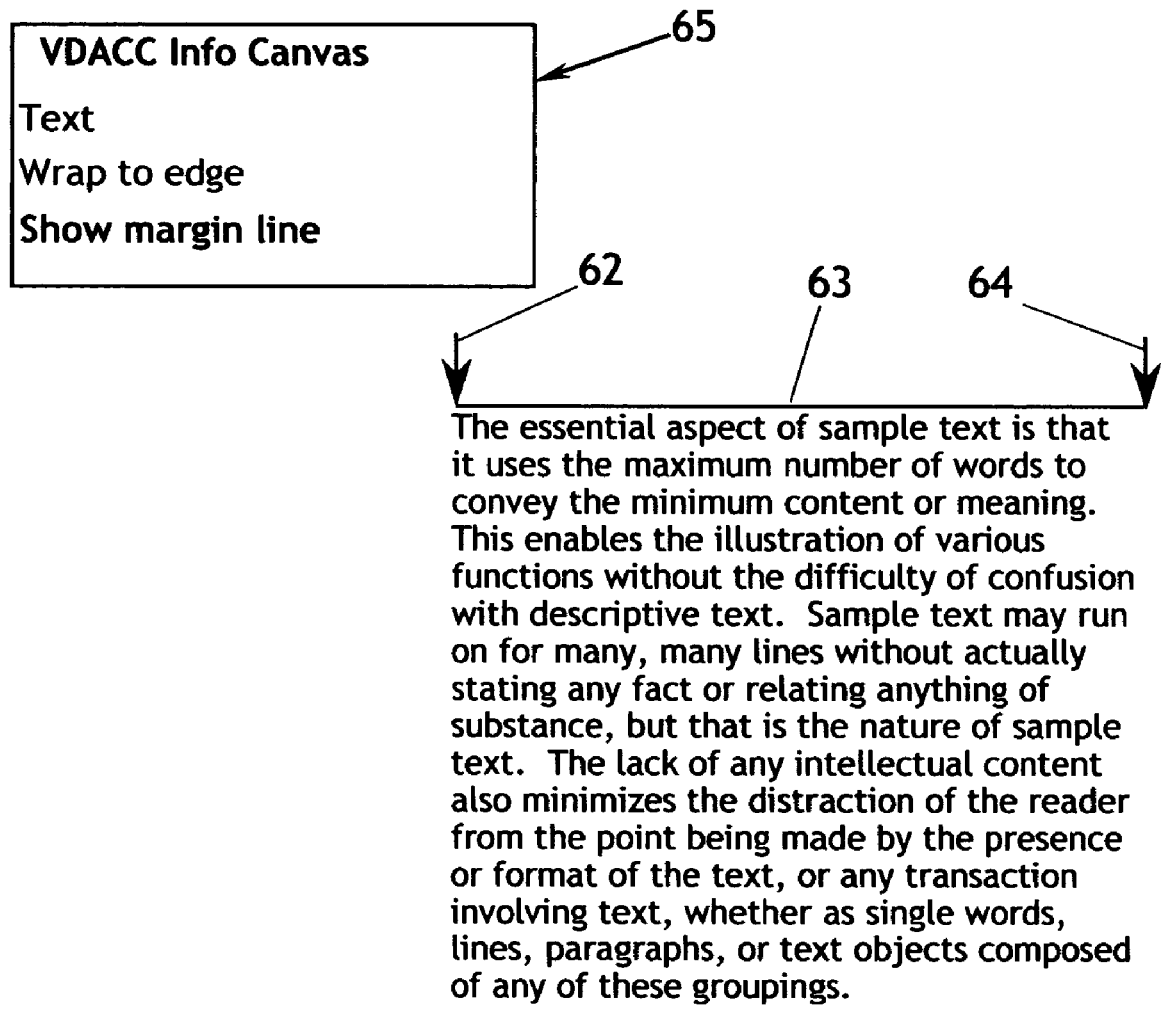
FIG. 24 is a graphic depiction of the method of the invention for displaying margin settings in text in primary blackspace.

Regarding using a text object in Blackspace (in other words, where the text object is not in a VDACC), the margin line and its margin arrows can be shown by right clicking on any character in the text object. With regard to FIG. 24, in the Info Canvas 65 for that text object a user can select the entry "Show margin line" or "Set text margins" or its equivalent. This will place the margin line 63 above the text object where the margin line's width equals that of the text object.

Another way to show or hide the margin line applies to a VDACC. Once text has been typed into a VDACC, a user can right click on any blank area of the VDACC to cause the Info Canvas for this VDACC to appear. Then in this Info Canvas the entry: "Set Text Margins" can be selected (turned on). When this entry is turned on, the Margin Line will appear with a right and left margin arrow already in place at locations that apply to the existing left and right margin of the selected text in the VDACC.

Figure 17:
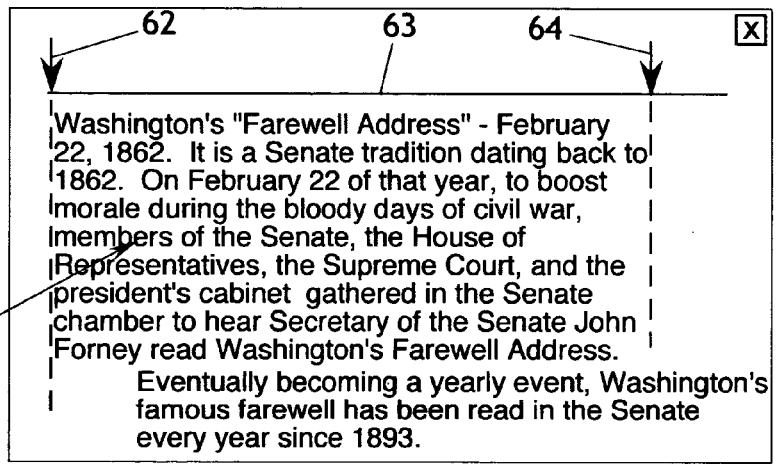
FIG. 17 is a graphic depiction of the margin line and margin arrows applied to a text object as in FIG. 16, showing the margin arrows moved to new locations and the text re-wrapping to the new settings.
Figure 18:
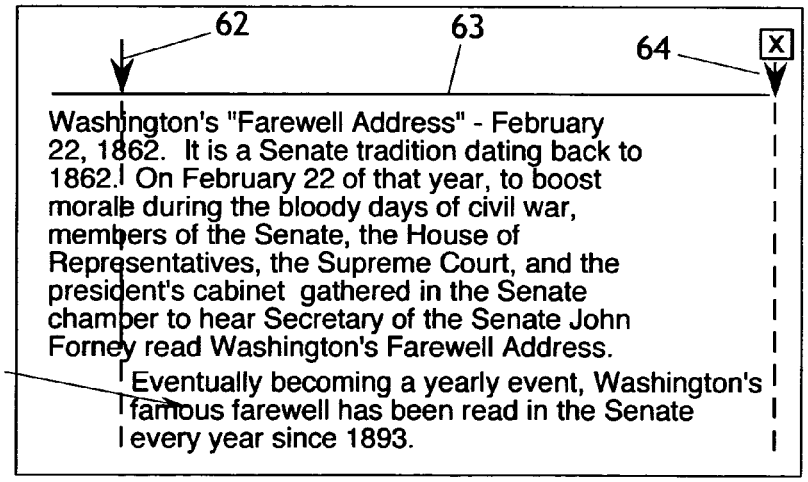
FIG. 18 is a graphic depiction of the margin line and margin arrows applied to a different portion of the text object of FIG. 16.

The user may select any portion of the text in a text object, or select all of the text in a text object, and click and drag either margin arrow 62 or 64 to change the left and/or right margins of the selected text. Thus, for example, a user may select text in text object 61, indicated by the shadowed area, and drag the margin arrow 64 to the left to reset the right margin of the text, as indicated in FIG. 17. If a new text portion 67 is selected by the user (FIG. 18), the margin arrows 62 and 64 jump to new positions along margin line 63 to indicate the margins of the selected portion. The margin arrows may once again be clicked on and dragged horizontally to alter the margins of text portion 67, as described above. If a group of lines of text or sentences is selected, and differing margin settings have been previously applied to some of these lines or sentences, the margin arrows 62 and 64 will move to indicate the margin settings of the top line of text of the selected group. Likewise, non-contiguous text lines may be selected by holding down the Ctrl key and clicking and dragging through the non-contiguous lines. In this case, the margin arrows 62 and 64 will move to indicate the margin settings of the topmost selected line of text. In any of these cases, if the user wishes to reset the margins of the disparate text lines to the positions of the arrows 62 or 64, the user may select the appropriate entries in the Info Canvas 71: "Set to left margin arrow", "Set to right margin arrow", or "Set to both margin arrows". In addition, either of the margin arrows 62 or 64 may be dragged horizontally to a desired position, which will cause the margins of all the selected text lines to reset to the new desired position.

When the user sets right and left margin arrows for selected text and then types in additional text for this text object, each added horizontal line of text will be governed by the margin settings for this selected text. Thus the text margins will be uniform, unless and until the user changes the position of one or both of the margin arrows. When either of the arrows is moved, all of the text typed in that selected text will be will be governed by the change in position of the margin arrow(s).

Figure 19A:
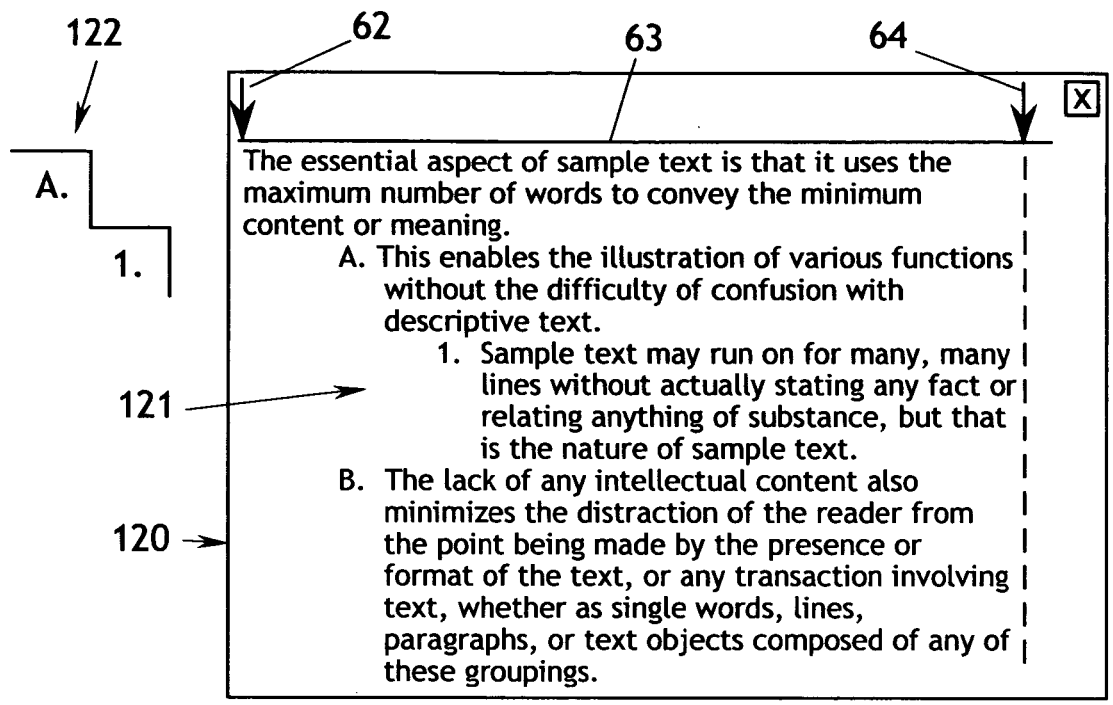
FIGS. 19A and 19B depict the interaction of margin arrow repositioning and heading formatting in a text object.
Figure 19B:
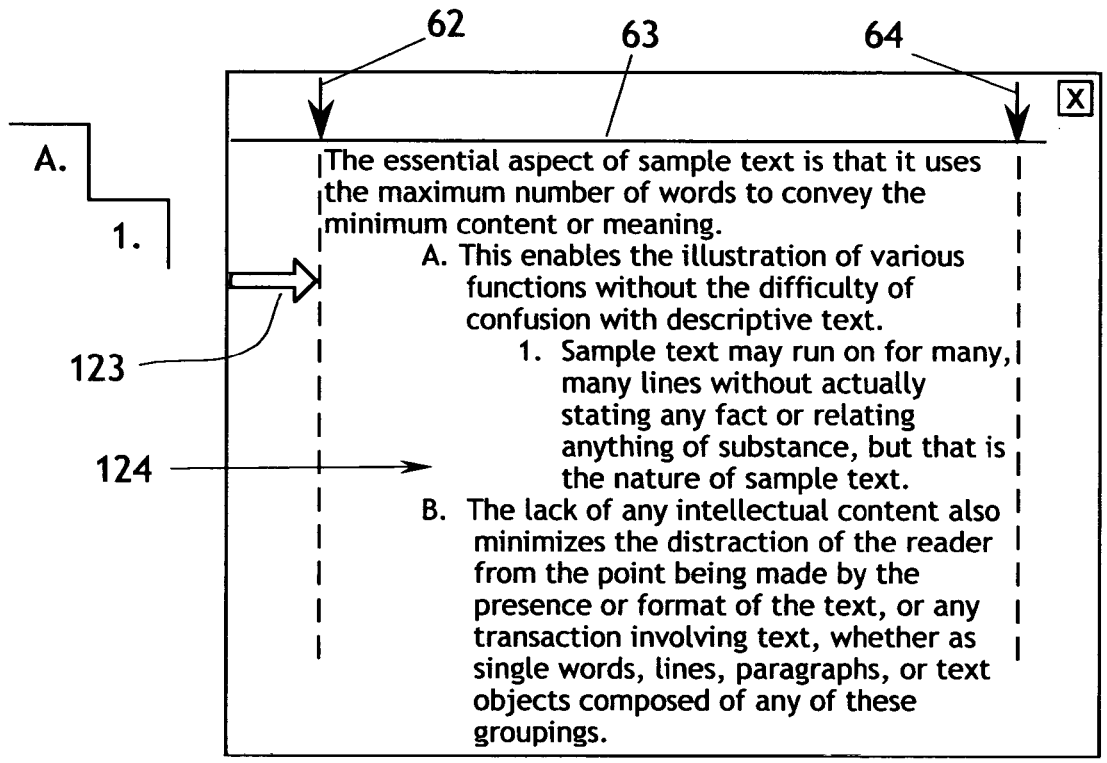

The margin control functions described above work seamlessly with the staircase formatting object functions, also described above. With regard to FIG. 19A, a text object 121 within a VDACC 120 is has heading formats set by staircase formatting object 122, and margins set by margin arrows 62 and 64 on margin line 63. When a margin arrow is relocated, such as in FIG. 19B where the margin arrow 62 has been moved to the right a distance shown by arrow 123, the heading formats indents to the right to the same degree as previously, and the text re-wraps from the right margin 64 to the left boundaries of the headings to reset the text as shown at reference numeral 124. The same general appearance of the format is maintained from FIGS. 19A to 19B.

Figure 20:
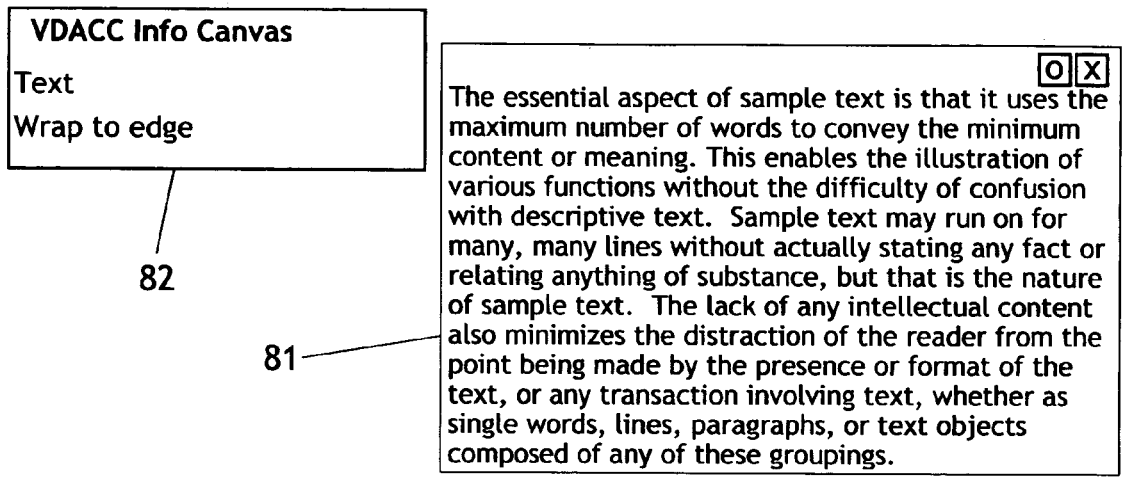
FIGS. 20 and 21 are sequential views depicting the use of a VDACC to define the width of a text object.
Figure 21:
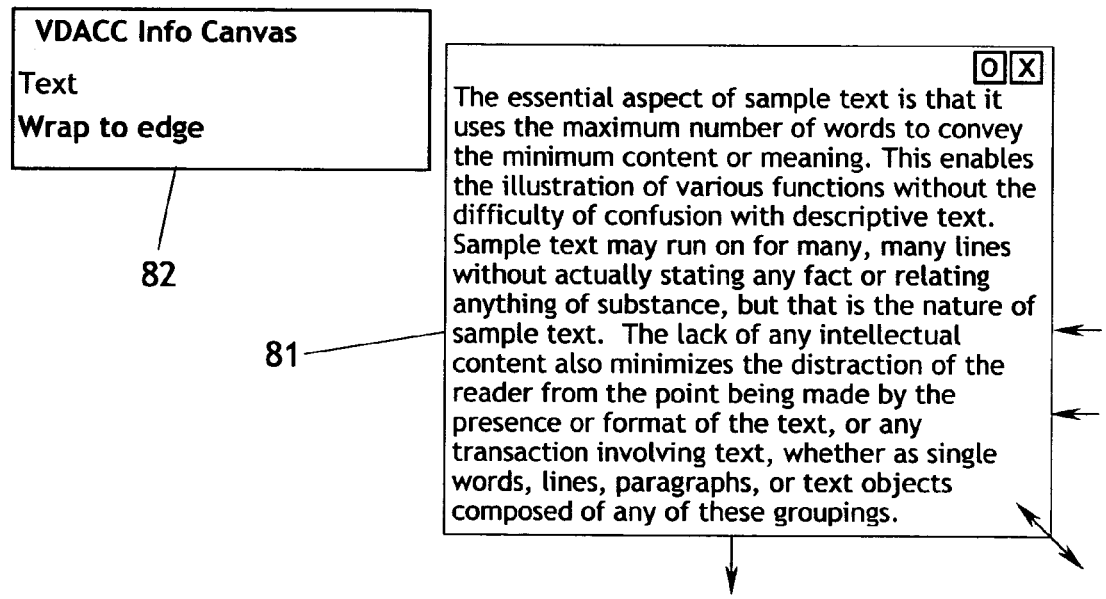

With regard to FIG. 20, another simple technique for setting the width of a text object is to type the text within a VDACC 81 and right click in the VDACC 81 to access the VDACC Info Canvas 82. Under the "Text" heading in the Info Canvas, the user may select "Wrap to edge". Thereafter, whenever the VDACC is resized (such as by clicking and dragging on the lower right corner) the text will reflow to remain within the confines of the VDACC, as shown in FIG. 21. Thus the margins of a column of text is easily controlled without recourse to the margin line and margin arrows.

Text objects typed into a VDACC can have a staircase object applied to them to create headings for sentences in this text object. Also, the margin line and margin arrows can be applied to all text objects typed in a VDACC and not turn off the stair object's control to create headings appropriately typed in the text. One method to accomplish this is to right click on a VDACC and in its Info Canvas select the entry, "Set Text Margins". This will automatically show the margin line with a left and right margin arrow already set to locations that equal the top line of any selected portion of text in the VDACC. If no text is selected, the right and left margin arrows will be set to locations that equal the left and right margins of the top line of the text typed into the VDACC.

Figure 22:
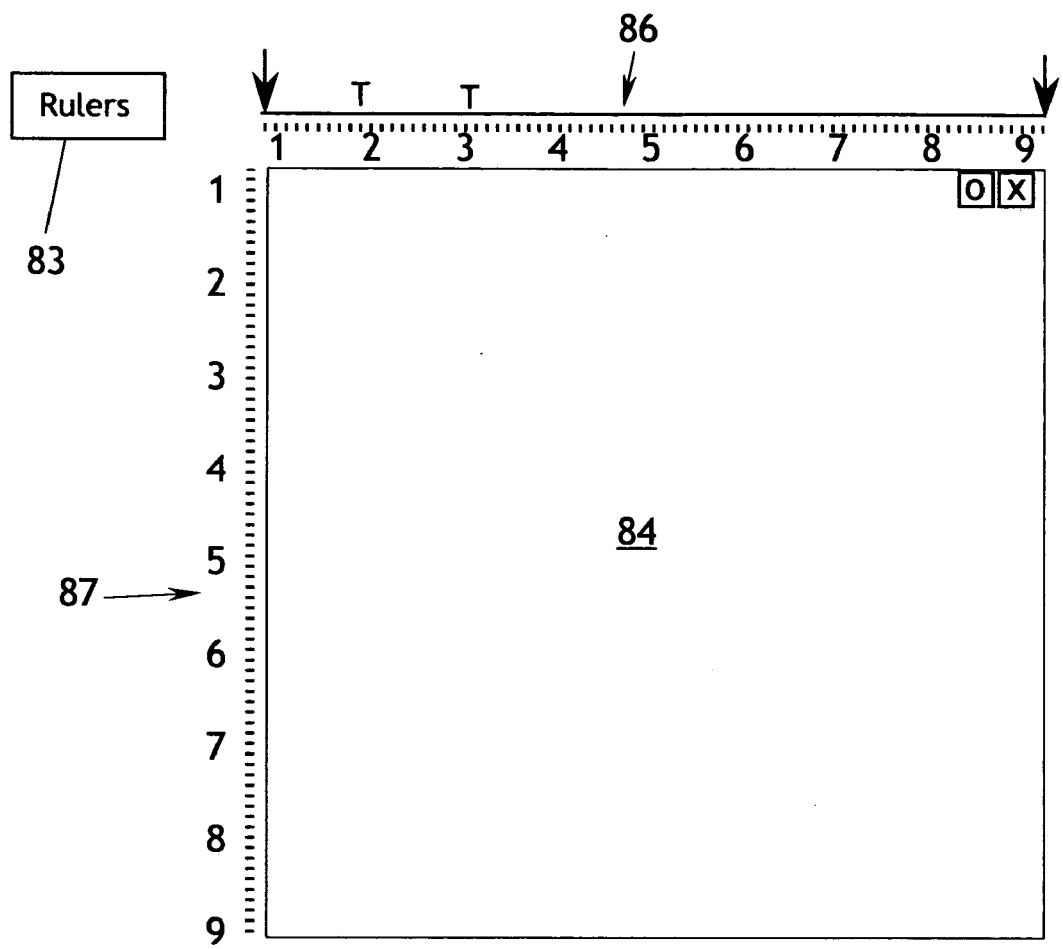
FIG. 22 depicts the rulers function and the switch mechanism for calling forth the ruler display for a VDACC.

Any VDACC may display a ruler to guide a user regarding the size of the VDACC and the size of any text object therein. As shown in FIG. 22, the user may draw a switch 83, label it "Rulers", and activate the switch 83. The switch, when ON, causes any VDACC 84 onscreen to display a horizontal ruler 86 that also includes the margin line and margin arrows described previously, as well as a vertical ruler 87. The rulers enable the user to precisely size and align text and other objects within the VDACC.

Figure 23:
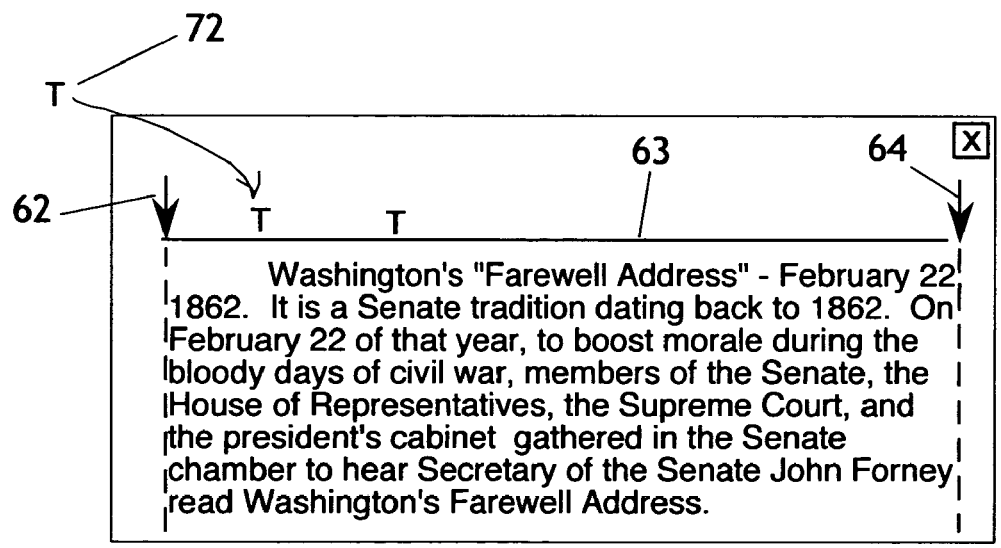
FIG. 23 is a graphic depiction of the method for setting tab stops of the present invention.

The margin line 63 may also be used to set tab stops. With regard to FIG. 23, one technique is to type a "T" (reference numeral 72) and drag it to the margin line 63. The "T" agglomerates to the line when it is dragged sufficiently close to the line, e.g., a few pixels. Once agglomerated to the margin line, the T may be dragged horizontally to set the tab position, but it may not be moved vertically. To set further tabs, the user may click on the "T", hold for a second, and drag away a duplicate. The duplicate is automatically agglomerated to the line 63, and may be moved horizontally to set a second tab stop, and so on. If only one tab stop is set (only one "T" is placed), striking the Tab key will indent to the position of the "T", and any further Tab key activation will indent again to double the first indent distance, and so on. If a second "T" has been placed, the second activation of the Tab key will move the indent to the position of the second "T", and a further Tab key activation will indent to the right side of the VDACC.

Any or all parts of a margin line display (margin arrows 62 and 64, tab stops) may be copied and pasted to apply the copied margin/tab settings of one section of a text object to another text object or section of that text object. The user may select a lasso function, then while lassoing the arrows 62 and 64 and any of the tab "T" settings, hold down the "Ctrl" key and the "c" key to copy these settings. The user then may scroll or otherwise move to another text object or portion of that text object or another portion of text within the same text object, select the new text portion, and hit "Ctrl v" to paste the margin and/or tab settings into the selected new text. The copied settings are then automatically applied to the new selected text. An alternate method of copying margin arrow and tab settings is to right click on the margin line and select the entry "Copy Margin Settings". Then scroll to the text that you wish to copy these margin settings to, highlight the text and then right click on the margin line again and select the entry: "Paste Margin Settings".

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. In an electronic device that accepts drawn graphic entries and includes a screen display, a method for creating headings in text displayed on the screen, including the steps of:
   drawing a staircase object having at least one vertical segment joined to at least one horizontal segment to define at least one step;
   recognizing the drawn staircase object;
   entering at least one alphanumeric character adjacent to said at least one step to define a heading style for said at least one step and create a staircase formatting object;
   substituting a graphic object for said at least one alphanumeric character;
   thereafter automatically creating a heading having said graphic object wherever said at least one alphanumeric character appears at the beginning of a line in said text.

2. The method of claim 1, wherein the step of substituting includes placing said graphic object onscreen, and drawing an arrow from said graphic object to said at least one alphanumeric character of said staircase formatting object.

3. The method of claim 1, wherein said graphic object comprises a bullet.

4. The method of claim 1, further including the step of displaying an Info Canvas for said graphic object.

5. The method of claim 4, further including the step of providing a selection in said Info Canvas to enable selecting and deselecting display of said graphic object in said heading.

6. The method of claim 4, further including the step of providing a Category selection in said Info Canvas to enable display of said graphic object in said heading whenever an alphanumeric character having a categorical similarity to said at least one alphanumeric character is placed at the beginning of a line in said text.

7. The method of claim 4, further including the step of providing a Individual Character selection in said Info Canvas to enable display of said graphic object in said heading only when said at least one alphanumeric character is placed at the beginning of a line in said text.

8. The method of claim 1, further including the step of assigning the placement of said graphic object in said heading to a designated keyboard function key, whereby pressing said designated keyboard function key at the beginning of a line in said text causes said graphic object to appear in said heading.

* * * * *